(12) United States Patent
Ayers et al.

(10) Patent No.: US 12,141,564 B2
(45) Date of Patent: *Nov. 12, 2024

(54) INSTANT INSTALLATION OF APPS

(71) Applicant: Digital Turbine, Inc., Austin, TX (US)

(72) Inventors: Brandon Brent Ayers, Austin, TX (US); Lior Ben Haim, Karkur (IL); Jonathan Nogueira, Zachary, LA (US)

(73) Assignee: Digital Turbine, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/198,330

(22) Filed: May 17, 2023

(65) Prior Publication Data

US 2023/0289161 A1 Sep. 14, 2023

Related U.S. Application Data

(63) Continuation of application No. 17/478,928, filed on Sep. 19, 2021, which is a continuation of application No. 16/992,194, filed on Aug. 13, 2020, now Pat. No. 11,157,256, which is a continuation of application No. 15/903,054, filed on Feb. 23, 2018, now Pat. No. 10,782,951.

(51) Int. Cl.
*G06F 9/44* (2018.01)
*G06F 8/61* (2018.01)
*G06F 21/45* (2013.01)
*G06F 21/57* (2013.01)

(52) U.S. Cl.
CPC ............... *G06F 8/61* (2013.01); *G06F 21/45* (2013.01); *G06F 21/57* (2013.01)

(58) Field of Classification Search
None
See application file for complete search history.

(56) References Cited

U.S. PATENT DOCUMENTS

| 6,131,192 | A | 10/2000 | Henry |
| 6,266,811 | B1 | 7/2001 | Nabahi |
| 8,732,827 | B1 | 5/2014 | Zhukov et al. |
| 8,756,225 | B1 * | 6/2014 | Lipkin ............... G06F 16/972 707/726 |
| 9,348,572 | B2 | 5/2016 | Farm et al. |
| 9,800,609 | B2 | 10/2017 | Liao |

(Continued)

OTHER PUBLICATIONS

Request for Trial Granted Dated Mar. 17, 2023 From the U.S. Appl. No. 16/992,194. (60 pages).

(Continued)

*Primary Examiner* — Insun Kang

(57) ABSTRACT

A device which runs software applications includes a network interface, a non-transitory computer readable storage medium and at least one processor. The device identifies that a link for installation of a new software application is selected by user interaction with a software application that is running on the device. In response to the identification, an installation client is invoked to run in the background on the device without exiting the currently-running software application. The installation client is instructed to automatically download an installation file of the new software application over the network using the network interface. The new software application is installed on the device using the downloaded installation file.

27 Claims, 15 Drawing Sheets

(56) References Cited

U.S. PATENT DOCUMENTS

| | | | |
|---|---|---|---|
| 9,940,400 | B2 | 4/2018 | Shapira et al. |
| 10,296,641 | B2 | 5/2019 | Sogani et al. |
| 10,353,686 | B1 | 7/2019 | Pasha et al. |
| 10,432,595 | B2 | 10/2019 | Frederick et al. |
| 10,671,367 | B2 | 6/2020 | Matthews et al. |
| 10,782,951 | B2 | 9/2020 | Ayers et al. |
| 11,157,256 | B2 | 10/2021 | Ayers et al. |
| 2005/0131971 | A1 | 6/2005 | James et al. |
| 2007/0234292 | A1 | 10/2007 | Kumar et al. |
| 2009/0064135 | A1 | 3/2009 | Jimmerson |
| 2010/0095294 | A1* | 4/2010 | Yamada .................. G06F 8/61 717/174 |
| 2011/0126192 | A1 | 5/2011 | Frost et al. |
| 2012/0198439 | A1 | 8/2012 | Kane |
| 2013/0050093 | A1 | 2/2013 | Kim et al. |
| 2014/0018041 | A1* | 1/2014 | Summerer ............... G06F 8/61 455/410 |
| 2014/0215565 | A1* | 7/2014 | Miyoshi ............... H04L 67/563 726/3 |
| 2015/0074659 | A1 | 3/2015 | Madsen et al. |
| 2015/0186126 | A1 | 7/2015 | Ivanov |
| 2015/0193215 | A1 | 7/2015 | Jianu et al. |
| 2016/0026462 | A1 | 1/2016 | Lang et al. |
| 2016/0077819 | A1 | 3/2016 | Xin et al. |
| 2016/0142859 | A1 | 5/2016 | Molinet et al. |
| 2016/0162451 | A1 | 6/2016 | Xu et al. |
| 2016/0216954 | A1 | 7/2016 | Jitkoff et al. |
| 2016/0283259 | A1 | 9/2016 | Mehta |
| 2016/0342403 | A1 | 11/2016 | Zamir et al. |
| 2016/0359945 | A1 | 12/2016 | Boudville |
| 2017/0010878 | A1 | 1/2017 | Barkie et al. |
| 2017/0052773 | A1 | 2/2017 | Deselaers et al. |
| 2017/0070361 | A1 | 3/2017 | Sundermeyer et al. |
| 2017/0078369 | A1 | 3/2017 | McDiarmid et al. |
| 2017/0192764 | A1 | 7/2017 | Cayre et al. |
| 2017/0192766 | A1* | 7/2017 | Sogani ..................... G06F 8/61 |
| 2017/0286081 | A1 | 10/2017 | Shantharam et al. |
| 2017/0034685 | A1 | 11/2017 | Wyatt et al. |
| 2018/0188924 | A1 | 7/2018 | Kumar et al. |
| 2018/0234496 | A1 | 8/2018 | Ratias |
| 2018/0332453 | A1 | 11/2018 | Molinet et al. |
| 2019/0012065 | A1 | 1/2019 | Lynch et al. |
| 2019/0068537 | A1 | 2/2019 | Judd et al. |
| 2019/0109927 | A1 | 4/2019 | Andrews et al. |
| 2019/0265958 | A1 | 8/2019 | Ayers et al. |
| 2020/0081696 | A1 | 3/2020 | Zmijewsky et al. |
| 2020/0371767 | A1 | 11/2020 | Ayers et al. |
| 2022/0004373 | A1 | 1/2022 | Ayers et al. |

OTHER PUBLICATIONS

Advisory Action Dated May 5, 2020 from the U.S. Appl. No. 15/903,054. (4 pages).
Corrected Notice of Allowance Dated Sep. 30, 2021 From the U.S. Appl. No. 16/992,194. (6 Pages).
Decision Granting Institution of Post-Grant Review 35 U.S.C. § 324—IronSource Ltd., Petitioner Versus Digital Turbine Inc., Patent Owner, Case PGR2021-00096 Dated Jan. 6, 2022 From the United States Patent and Trademark Office, Before the Patent Trial and Appeal Board. (55 Pages).
IronSource Exhibit 1002 Prosecution History of '951 Patent, Commissioner for Patents, p. 1-275, Feb. 23, 2018. (Part 1).
IronSource Exhibit 1002 Prosecution History of '951 Patent, Commissioner for Patents, p. 1-275, Feb. 23, 2018. (Part 2).
IronSource Exhibit 1002 Prosecution History of '951 Patent, Commissioner for Patents, p. 1-275, Feb. 23, 2018. (Part 3).
Issue Notification—Exhibit 2001—File History Dated Oct. 26, 2021 From the U.S. Appl. No. 16/992,194. (183 Pages).
Issue Notification—Exhibit 2012—Reporter's Remote Transcript of Proceedings,: 11 P., Mar. 15, 2022.
Judgment Final Written Decision Dated Jan. 4, 2023 From The United States Patent and Trademark Office Before the Patent Trial and Appeal Board *Ironsurce Ltd.* Petitioner, v. *Digital Turbine Inc.* Patent Owner,PGR2021-00096, Patent 10,782,951 B2.
Notice of Allowance Dated Jun. 16, 2021 from the U.S. Appl. No. 16/992,194. (12 pages).
Notice of Allowance Dated Jun. 2, 2020 from the U.S. Appl. No. 15/903,054. (12 pages).
Notice of Filing Date Accorded To Petition and Time For Filing Patent Owner Preliminary Response—Ironsource Ltd. Petitioner Versus Digital Turbine Inc., Patent Owner, Case PGR2021-00096, U.S. Pat. No. 10,782,951 B2, Dated Jul. 9, 2021 From the United States Patent and Trademark Office, Before the Patent Trial and Appeal Board. (5 Pages).
Office Action Dated Dec. 30, 2020 From the Israel Patent Office Re. Application No. 264975 and Its Translation Into English. (8 Pages).
Official Action Dated Jan. 3, 2020 From the US Patent and Trademark Office Re. U.S. Appl. No. 15/903,054. (18 pages).
Official Action Dated Jun. 27, 2019 From the US Patent and Trademark Office Re. U.S. Appl. No. 15/903,054. (19 pages).
Order Conduct of Proceedings 37 C.F.R §§ 42.5; 42.20(d) Dated Oct. 18, 2021 Before the Patent Trial and Appeal Board, United States Patent and Trademark Office Re. PGR2021-00096, U.S. Pat. No. 10,782,951 B2. (4 Pages).
Patent Owner's Preliminary Response to Petition for Post-Granted Review of U.S. Pat. No. 10,782,951 Dated Oct. 8, 2021 Before the Patent Trial and Appeal Board, Un ited States Patent and Trademark Office Re. Case No. PGR2021-00096. (54 Pages).
Patent Owners Response To Petition For Post-Grant Review of U.S. Pat. No. 10,782,951 Dated Apr. 1, 2022 Before The Patent Trial And Appeal Board United States Patent and Trademark Office Re. Case No. PGR2021-00096, U.S. Pat. No. 10,782,951, Patent Owner's Updated Exhibit List.(4 Pages).
Patent Owners Response To PetitionFor Post-Grant Review of U.S. Pat. No. 10,782,951 Dated Apr. 1, 2022 Before ThE Patent Trial And Appeal Board United States Patent and Trademark Office Re. Case No. PGR2021-00096, U.S. Pat. No. 10,782,951, Patent Owner's Contingent Motion To Amend Under 37 C.F.R. Para. 42.221 (38 Pages).
Patent Owners Response To PetitionFor Post-Grant Review of U.S. Pat. No. 10,782,951 Dated Apr. 1, 2022 Before The Patent Trial And Appeal Board United States Patent and Trademark Office Re. Case No. PGR2021-00096, U.S. Pat. No. 10,782,951, Patent Owner's Response To Petition For Post Grant Revie of U.S. Pat. No. 10,782,951. (67 Pages).
Patent Owner's Sur-Reply to Petitioner's Reply to Patent Owner's Preliminary Response Dated Nov. 1, 2021 Before the Patent Trial and Appeal Board, United States Patent and Trademark Office Re. Case No. PGR2021-00096, U.S. Pat. No. 10,782,951. (12 Pages).
Petition for Post-Grant Review of Claims 1-18 of U.S. Pat. No. 10,782,951—IronSource Ltd., Petitioner Versus Digital Turbine Inc., Patent Owner, Case PGR2021-00096 Dated Jun. 21, 2021 From the United States Patent and Trademark Office, Before the Patent Trial and Appeal Board. (103 Pages).
Petitioner's Reply to Patent Owner's Preliminary Response Regarding the Inapplicability of 35 U.S.C. 325(d) and the Presentation of An Erroneous Claim Construction Dated Oct. 25, 2021 Before the Patent Trial and Appeal Board, United States Patent and Trademark Office Re. PGR2021-00096, U.S. Pat. No. 10,782,951. (11 Pages).
Almaroth Exhibit 1023 (Expert Declaration of Kevin Almeroth) reduced. Jun. 2022.
Almeroth Expert Declaration of Kevin C. Almeroth in Support Of IronSource Ltd's Petition for Post-Grant Review of Claims 1-18 of U.S. Pat. No. 10,782,951. (Part 1).
Almeroth Expert Declaration of Kevin C. Almeroth in Support Of IronSource Ltd's Petition for Post-Grant Review of Claims 1-18 of U.S. Pat. No. 10,782,951. (Part 2).
Almeroth Expert Declaration of Kevin C. Almeroth in Support Of IronSource Ltd's Petition for Post-Grant Review of Claims 1-18 of U.S. Pat. No. 10,782,951. (Part 3).
Almeroth Expert Declaration of Kevin C. Almeroth in Support Of IronSource Ltd's Petition for Post-Grant Review of Claims 1-18 of U.S. Pat. No. 10,782,951. (Part 4).

(56) References Cited

OTHER PUBLICATIONS

Almeroth Issue Notification—Exhibit 2004—Zoom Deposition of Kevin Almeroth, Ph.D., Video & Web Videoconference Santa Barbara, California, Mar. 16, 2022. (Part 1).
Almeroth Issue Notification—Exhibit 2004—Zoom Deposition of Kevin Almeroth, Ph.D., Video & Web Videoconference Santa Barbara, California, Mar. 16, 2022. (Part 2).
Casey "Android Vs. iOS Development: Background Processing", LinkedIn, 7 P., Jun. 27, 2016.
Chen et al. Issue Notification—Exhibit 2008—"Peeking Into Your App without Actually Seeing It: UI State Inference and Novel Android Attacks", Proceedings of the 23rd USENIX Security Symposium, San Diego,: 16P., Aug. 2014.
Curry "App Store Data (2021)", Apps in the Apple App Store, 23 P., May 13, 2021.
Downing Issue Notification—Exhibit 2003—"Redirect", Dictionary of Computer and Internet Terms, 12th Edition, Barron's Educational Series: 409, 1997.
Fernandes et al. Issue Notification—Exhibit 2009—"Android UI Deception Revisited: Attacks and Defenses", International Conference on Financial Cryptography and Data Security Financial Cryptography and Data Security: 41-59, May 17, 2017.
Fielding et al. Issue Notification—Exhibit 2011—"Hypertext Transfer Protocol—Http/ 1.1": 177P., Retrieved from Internet, Jun. 2019. (Part 1).
Fielding et al. Issue Notification—Exhibit 2011—"Hypertext Transfer Protocol—Http/ 1.1": 177P., Retrieved from Internet, Jun. 2019. (Part 2).
Fou Issue Notification—Exhibit 2006—"Attribution—The Weakest Link In All Digital Marketing": 3P., Retrieved from Internet, Mar. 20, 2022.
Java Issue Notification—Exhibit 2007—"Running Android tasks in Background Threads": 9P., Retrieved from Internet, Oct. 27, 2021.
Ma et al. "Automating Release of Deep-Link APIs on Android", ArXiv Preprint ArXiv:1711.11564v1, p. 1-25, Nov. 30, 2017.
Maddern "A Brief History of Deep Linking", Verizon Media, p. 1-9, Jun. 12, 2015.
Mao Exhibit 1024—Deposition of Zhuoqing Morley Mao. Ph.D, Dated May 26, 2022. (Part 1).
Mao Exhibit 1024—Deposition of Zhuoqing Morley Mao. Ph.D, Dated May 26, 2022. (Part 2).
Mao Issue Notification—Exhibit 2005—Declaration of Dr. Z. Morley Mao Ph.D., 90P., Mar. 31, 2022.
McClusky "Using Java Reflection", Oracle, Technical Article, 12 P., Jan. 1998.
My Mail Ltd. Exhibit 1025—(MyMail v ooVoo), Aug. 19, 2021.
Parate et al. Issue Notification—Exhibit 2010—"Practical Prediction and Prefetch for Faster Access to Applications on Mobile Phones", Proceedings of the ACM international Joint Conference on Pervasive and Ubiquitous Computing: 275-284, Sep. 8, 2013.
U.S. Court of Appeals *Whitserve LLC*, Plaintiff-Appellant v. *Droppbox, Inc.*, Defendant-Appellee, Appeal From the United States District Court for the District of Delaware in No. 1:18-cv-00665-CFC, Decided Apr. 26, 2021 From the United States Court of Appeals for the Federal Circuit, Case 19-2334. (13 Pages).
USPTO USPTO Forwards Petition Dated Jul. 9, 2021.
Webopedia Issue Notification—Exhibit 2002—"Invocation", What is Invocation, Webopedia, 3P., Sep. 1, 1996, From the U.S. Pat. No. 10,782,951. (3 Pages).
Official Action Dated Dec. 19, 2023 from the U.S. Appl. No. 17/478,928. (44 pages).
Appeal from the United States Patent and Trademark Office, Patent Trial and Appeal Board in No. PGR2021-00096 Dated Oct. 20, 2023 From The United States Court of Appeals for the Federal Circuit. (2 Pages).
Conduct of Proceedings 37 U.S.C. §§ 42.5 ,42.221 (a) Dated May 30, 2023 From The United States Patent and Trademark Office Before the Patent Trial and Appeal Board, Re. Case PGR2022-00053 U.S. Pat. No. 11,157,256. (4 Pages).
Decision Granting Institution of Post-Grant Review 35 U.S.C. § 324 Dated Mar. 17, 2023—Paper 10—From The United States Patent and Trademark Office Before the Patent Trial and Appeal Board, Re. Case PGR2022-00053 U.S. Pat. No. 11,157,256. (60 Pages).
Errata Dated Sep. 28, 2022—Paper 8—From The United States Patent and Trademark Office Before the Patent Trial and Appeal Board, Re. Case PGR2022-00053 U.S. Pat. No. 11,157,256. (2 Pages).
Exhibit 1002—Prosecution history of U.S. Pat. No. 11,157,256 from Case PGR2022-00053—Petition for Post-Grant Review of Claims 1-22 of U.S. Pat. No. 11,157,256 Dated Jul. 25, 2022 From the USPTO, Before the Patent Trial and Appeal Board. (183 Pages).
Exhibit 1003—U.S. Pat. No. 10,353,686 issued to Pasha et al. from Case PGR2021-00096—Petition for Post-Grant Review of Claims 1-18 of U.S. Pat. No. 10,782,951 Dated Jun. 21, 2021 From the USPTO, Before the Patent Trial and Appeal Board.
Exhibit 1004—U.S. Published Patent Application No. 2010/0095294 to Yamada et al. from Case PGR2021-00096—Petition for Post-Grant Review of Claims 1-18 of U.S. Pat. No. 10,782,951 Dated Jun. 21, 2021 From the USPTO, Before the Patent Trial and Appeal Board.
Exhibit 1005—U.S. Published Patent Application No. 2016/0142859 to Molinet et al. from Case PGR2021-00096—Petition for Post-Grant Review of Claims 1-18 of U.S. Pat. No. 10,782,951 Dated Jun. 21, 2021 From the USPTO, Before the Patent Trial and Appeal Board.
Exhibit 1006—"App Store Data (2021)"—Business of Apps, May 13, 2021. by David Curry from Case PGR2021-00096—Petition for Post-Grant Review of Claims 1-18 of U.S. Pat. No. 10,782,951 Dated Jun. 21, 2021 From the USPTO, Before the Patent Trial and Appeal Board.
Exhibit 1007—"A Brief History of Deep Linking", Verizon Media, p. 1-9, Jun. 12, 2015 from Case PGR2021-00096—Petition for Post-Grant Review of Claims 1-18 of U.S. Pat. No. 10,782,951 Dated Jun. 21, 2021 From the USPTO, Before the Patent Trial and Appeal Board.
Exhibit 1008—Expert Declaration of Kevin C. Almeroth in Support of Ironsource Ltd.'s, dated Jun. 21, 2021 from Case PGR2021-00096—Petition for Post-Grant Review of Claims 1-18 of U.S. Pat. No. 10,782,951 Dated Jun. 21, 2021 From the USPTO, Before the Patent Trial and Appeal Board.
Exhibit 1009—U.S. Pat. No. 10,296,641 issued to Sogani et al. from Case PGR2021-00096—Petition for Post-Grant Review of Claims 1-18 of U.S. Pat. No. 10,782,951 Dated Jun. 21, 2021 From the USPTO, Before the Patent Trial and Appeal Board.
Exhibit 1010—U.S. Pat. No. 9,940,400 issued to Shapira et al. from Case PGR2021-00096—Petition for Post-Grant Review of Claims 1-18 of U.S. Pat. No. 10,782,951 Dated Jun. 21, 2021 From the USPTO, Before the Patent Trial and Appeal Board.
Exhibit 1011—"Android Vs. iOS Development: Background Processing", LinkedIn, Jun. 27, 2016 from Case PGR2021-00096—Petition for Post-Grant Review of Claims 1-18 of U.S. Pat. No. 10,782,951 Dated Jun. 21, 2021 From the USPTO, Before the Patent Trial and Appeal Board.
Exhibit 1012—U.S. Pat. No. 10,671,367 issued to Matthews et al. from Case PGR2021-00096—Petition for Post-Grant Review of Claims 1-18 of U.S. Pat. No. 10,782,951 Dated Jun. 21, 2021 From the USPTO, Before the Patent Trial and Appeal Board.
Exhibit 1013—U.S. Pat. No. 8,732,827 issued to Zhukov et al. from Case PGR2021-00096—Petition for Post-Grant Review of Claims 1-18 of U.S. Pat. No. 10,782,951 Dated Jun. 21, 2021 From the USPTO, Before the Patent Trial and Appeal Board.
Exhibit 1014—U.S. Pat. No. 9,800,609 issued to Liao from Case PGR2021-00096—Petition for Post-Grant Review of Claims 1-18 of U.S. Pat. No. 10,782,951 Dated Jun. 21, 2021 From the USPTO, Before the Patent Trial and Appeal Board.
Exhibit 1015—U.S. Pat. No. 6,266,811 issued to Nabahi from Case PGR2021-00096—Petition for Post-Grant Review of Claims 1-18 of U.S. Pat. No. 10,782,951 Dated Jun. 21, 2021 From the USPTO, Before the Patent Trial and Appeal Board.
Exhibit 1016—U.S. Pat. No. 6,131,192 issued to Slivka et al. from Case PGR2021-00096—Petition for Post-Grant Review of Claims

(56) References Cited

OTHER PUBLICATIONS 1-18 of U.S. Pat. No. 10,782,951 Dated Jun. 21, 2021 From the USPTO, Before the Patent Trial and Appeal Board.
Exhibit 1017—"Using Java Reflection", Oracle, Technical Article, 12 P., Jan. 1998 y Glen McCluskey from Case PGR2021-00096—Petition for Post-Grant Review of Claims 1-18 of U.S. Pat. No. 10,782,951 Dated Jun. 21, 2021 From the USPTO, Before the Patent Trial and Appeal Board.
Exhibit 1018—*Whitserve LLC*, Plaintiff-Appellant v. *Droppbox, Inc.*, Defendant-Appellee, Appeal From the United States District Court for the District of Delaware in No. 1:18-cv-00665-CFC, Decided Apr. 26, 2021 From the United States Court of Appeals for the Federal Circuit, Case 19-2334, from Case PGR2021-00096—Petition for Post-Grant Review of Claims 1-18 of U.S. Pat. No. 10,782,951 Dated Jun. 21, 2021 From the USPTO, Before the Patent Trial and Appeal Board.
Exhibit 1021—Petition for Post Grant Review of Claims 1-18 of U.S. Pat. No. 10,782,951, PGR2021-00096, Paper 2 from Case PGR2022-00053—Petition for Post-Grant Review of Claims 1-22 of U.S. Pat. No. 11,157,256 Dated Jul. 25, 2022 From the USPTO, Before the Patent Trial and Appeal Board. (103 Pages).
Exhibit 1026—Declaration of Paul D. Ackerman in Opposition to Patent Owner's Motion to Quash Dated Aug. 30, 2022 From the US Patent and Trademark Office Before the Patent Trial and Appeal Board Re. Case PGR2021-00096 U.S. Pat. No. 10,782,951. (12 Pages).
Exhibit 1027—Remote Expert Deposition of Zhuoqing Morley Mao Ph.D, Dated Sep. 1, 2021 From the US Patent and Trademark Office Before the Patent Trial and Appeal Board Re. Case PGR2021-00096 U.S. Pat. No. 10,782,951. (15 Pages).
Exhibit 2003—"Redirect", Dictionary of Computer and Internet Terms,12th Edition, Barron's Educational Series: 409, 1997, From Case PGR2022-00053—Patent Owner's Preliminary Response to Petition for Post-Grant Review of U.S. Pat. No. 11,572,256 Dated Dec. 22, 2022 From the USPTO, Before the Patent Trial and Appeal Board.
Exhibit 2004—"Hypertext Transfer Protocol—Http/ 1.1" Retrieved from Internet, Jun. 2019. From Case PGR2022-00053—Patent Owner's Preliminary Response to Petition for Post-Grant Review of U.S. Pat. No. 11,572,256 Dated Dec. 22, 2022 From the USPTO, Before the Patent Trial and Appeal Board (177 Pages).
Exhibit 2005—Declaration of Dr. Z. Morley Mao Ph.D., From Case PGR2022-00053—Patent Owner's Preliminary Response to Petition for Post-Grant Review of U.S. Pat. No. 11,572,256 Dated Dec. 22, 2022 From the USPTO, Before the Patent Trial and Appeal Board (60 Pages).
Exhibit 2013—Supplemental Declaration of Zhuoqing Morley Mao, Ph.D.Dated Aug. 4, 2022 From the US Patent and Trademark Office Before the Patent Trial and Appeal Board Re. Case PGR2021-00096 U.S. Pat. No. 10,782,951. (15 Pages).
Exhibit 2014—Redline of Declaration of Kevin Almeroth ISO Opposition to Motion to Amend (previously Paper 31) From Case PGR2022-00053—Patent Owner's Sur-Reply For Post-Grant Review of U.S. Pat. No. 11,157,256 Dated Oct. 13, 2023 From the USPTO, Before the Patent Trial and Appeal Board (46 Pages).
Judgment—Final Written Decision Determining All Challenged Claims Unpatentable Denying Patent Owner's Contingent Motion to Amend Granting-in-Part Petitioner's Motion to Exclude Denying Patent Owner's Motion to Exclude 35 U.S.C. §§ 326(d), 328(a); 37 C.F.R. § 42.64(c) Dated Jan. 4, 2023 From the US Patent and Trademark Office Before the Patent Trial and Appeal Board Re. Case PGR2021-00096 U.S. Pat. No. 10,782,951. (96 Pages).
Order Conduct of Proceeding 37 C.F.R. §§ 42.5; 42.6(a); 42.20(d) Dated Nov. 22, 2021 From the US Patent and Trademark Office Before the Patent Trial and Appeal Board Re. Case PGR2021-00096 U.S. Pat. No. 10,782,951 B26. (4 Pages).
Order Conduct of Proceedings 37 U.S.C. §§ 42.5 ,42.221 (a) Dated Mar. 28, 2022 From The United States Patent and Trademark Office Before the Patent Trial and Appeal Board, Re. Case PGR2021-00096 U.S. Pat. No. 10,782,951 B2. (5 Pages).

Order Conduct of the Proceeding 37 U.S.C. §§ 42.5, 42.53 Dated Oct. 3, 2023 From The United States Patent and Trademark Office Before the Patent Trial and Appeal Board, Re. Case PGR2022-00053 U.S. Pat. No. 11,157,256. (8 Pages).
Order Conduct of the Proceeding 37 U.S.C. §§ 42.5, 42.53 Dated Dec. 6, 2023 From The United States Patent and Trademark Office Before the Patent Trial and Appeal Board, Re. Case PGR2022-00053 U.S. Pat. No. 11,157,256. (4 Pages).
Order Conduct of the Proceeding 37 U.S.C. §§ 42.5, 42.53 Dated Aug. 31, 2022 From the US Patent and Trademark Office Before the Patent Trial and Appeal Board Re. Case PGR2021-00096 Patent No. 10,782,951. (7 Pages).
Order Granting The Parties' Request or Oral Argument 37 C.F.R.§ 42.70 Dated Sep. 6, 2022 From the US Patent and Trademark Office Before the Patent Trial and Appeal Board Re. Case PGR2021-00096 U.S. Pat. No. 10,782,951. (10 Pages).
Patent Onwner's Response To Petition for Post-Grant Review of U.S. Pat. No. 11,157,256 Dated Jun. 8, 2023 From The United States Patent and Trademark Office Before the Patent Trial and Appeal Board, Re. Case PGR2022-00053 U.S. Pat. No. 11,157,256. (65 Pages).
Patent Owneer's Response To Petitioner's Motion For Collateral Estoppel Dated Jan. 2, 2024 From The United States Patent and Trademark Office Before the Patent Trial and Appeal Board, Re. Case PGR2022-00053 U.S. Pat. No. 11,157,256. (10 Pages).
Patent Owner's Contingent Motion To Amend Under 37 C.F.R. § 42.221 Dated Apr. 1, 2022 From the US Patent and Trademark Office Before the Patent Trial and Appeal Board Re.Case No. PGR2021-00096 U.S. Pat. No. 10,782,951. (38 Pages).
Patent Owner's Contingent Motion To Amend Under 37 C.F .R. § 42.221 Dated Jun. 8, 2023 From The United States Patent and Trademark Office Before the Patent Trial and Appeal Board, Re. Case PGR2022-00053 U.S. Pat. No. 11,157,256. (43 Pages).
Patent Owner's Notice of Appeal Dated Mar. 7, 2023 From the US Patent and Trademark Office Before the Patent Trial and Appeal Board Re. Case PGR2021-00096 U.S. Pat. No. 10,782,951.(5 Pages).
Patent Owner's Objection To Evidence Submitted With Petitioneer's (Corrected) Opposition To Patent Owner's Contingent Motion To Amend Dated Oct. 11, 2023 From The United States Patent and Trademark Office Before the Patent Trial and Appeal Board, Re. Case PGR2022-00053 U.S. Pat. No. 11,157,256. (4 Pages).
Patent Owner's ObjectionsTo Evidence Submitted with Petitioner's Reply To Patent Owner's Response and Opposition To Patent Owner's Response and Opposition To Patent Owners Contingent Motion to Amend Dated Sep. 8, 2023 From The United States Patent and Trademark Office Before the Patent Trial and Appeal Board, Re. Case PGR2022-00053 U.S. Pat. No. 11,157,256. (4 Pages).
Patent Owner's Preliminairy Response To Petion for Post-Grant Revie of U.S. Pat. No. 10,782,951 Dated Oct. 9, 2021 From the US Patent and Trademark Office Before the Patent Trial and Appeal Board Re. Case No. PGR2021-00096 U.S. Pat. No. 10,782,951. (54 Pages).
Patent Owner's Preliminairy Response to Petition for Post-Grantt Review of U.S. Pat. No. 11,572,256 Dated Dec. 22, 2022 From The United States Patent and Trademark Office Before the Patent Trial and Appeal Board, Re. Case PGR2022-00053 U.S. Pat. No. 11,157,256. (37 Pages).
Patent Owner's Reply To Petitioner's Opposition To Patent Owner's Revised Motion To Amend Dated Dec. 22, 2023 From The United States Patent and Trademark Office Before the Patent Trial and Appeal Board, Re. Case PGR2022-00053 U.S. Pat. No. 11,157,256. (19 Pages).
Patent Owner's Revised Motion To Amend Dated Oct. 13, 2023 From The United States Patent and Trademark Office Before the Patent Trial and Appeal Board, Re. Case PGR2022-00053 U.S. Pat. No. 11,157,256. (38 Pages).
Patent Owner's Sur-Reply For Post-Grant Review of U.S. Pat. No. 10,782,951 Dated Aug. 5, 2022 From the US Patent and Trademark Office Before the Patent Trial and Appeal Board Re. Case PGR2021-00096 U.S. Pat. No. 10,782,951. (32 Pages).

(56) References Cited

OTHER PUBLICATIONS

Patent Owner's Sur-Reply For Post-Grant Review of U.S. Pat. No. 11,157,256 Dated Oct. 13, 2023 From The United States Patent and Trademark Office Before the Patent Trial and Appeal Board, Re. Case PGR2022-00053 U.S. Pat. No. 11,157,256. (13 Pages).
Petioner's Opposition To Patent Owner's Contingent Motion To Amend (Corrected) Dated Oct. 4, 2023 From The United States Patent and Trademark Office Before the Patent Trial and Appeal Board, Re. Case PGR2022-00053 U.S. Pat. No. 11,157,256. (33 Pages).
Petition For Pos-Grant Review of Claims 1-22 of U.S. Pat. No. 11,157,256 Dated Jul. 25, 2022 From The United States Patent and Trademark Office Before the Patent Trial and Appeal Board, Re. Case PGR2022-00053 U.S. Pat. No. 11,157,256. (104 Pages).
Petition for Post-Grant Review of Claims 1-22 of U.S. Pat. No. 11,157,256 Dated Jul. 25, 2022 From the United States Patent and Trademark Office Before the Patent Trial Appeal Board. (104 Pages).
Petitionar's Sur-Reply in Oposition to Patent Owner's Revised Motion to Amend Dated Jan. 17, 2024 From the US Patent and Trademark Office Before the Patent Trial and Appeal Board Re. Case PGR2022-00053 U.S. Pat. No. 11,157,256. (15 Pages).
Petitioner's Demonstrative Exhibits Dated Sep. 27, 2022 From the US Patent and Trademark Office Before the Patent Trial and Appeal Board Re. Case PGR2021-00096 U.S. Pat. No. 10,782,951. (86 Pages).
Petitioner's Demonstrative Exhibits Dated Sep. 30, 2022 From the US Patent and Trademark Office Before the Patent Trial and Appeal Board Re. Case PGR2021-00096 U.S. Pat. No. 10,782,951. (87 Pages).
Petitioner's Miscellaneous Motion to Preclude Patent Owner's Arguments Based on Issue Preclusion/Collateral Estoppel and Waiver Dated Dec. 15, 2023 From The United States Patent and Trademark Office Before the Patent Trial and Appeal Board, Re. Case PGR2022-00053 U.S. Pat. No. 11,157,256. (23 Pages).
Petitioner's Objections To Certain Evidence Dated Jun. 14, 2023 From The United States Patent and Trademark Office Before the Patent Trial and Appeal Board, Re. Case PGR2022-00053 U.S. Pat. No. 11,157,256. (3 Pages).
Petitioner's Opposition To Patent Owner's Contingent Motion To Amend Dated Jun. 24, 2022 From the US Patent and Trademark Office Before the Patent Trial and Appeal Board Re. Case PGR2021-00096 U.S. Pat. No. 10,782,951. (33 Pages).
Petitioner's Opposition To Patent Owner's Revised Motion to Amend Dated Nov. 28, 2023 From The United States Patent and Trademark Office Before the Patent Trial and Appeal Board, Re. Case PGR2022-00053 U.S. Pat. No. 11,157,256. (31 Pages).
Petitioner's Reply In Support of Petition Dated Sep. 1, 2023 From The United States Patent and Trademark Office Before the Patent Trial and Appeal Board, Re. Case PGR2022-00053 U.S. Pat. No. 11,157,256. 31 Pages).
Petitioner's Reply In Support of Petition Dated Jun. 24, 2022 From the US Patent and Trademark Office Before the Patent Trial and Appeal Board Re. Case Case PGR2021-00096 U.S. Pat. No. 10,782,951. (32 Pages).
Petitioner's Reply To Patent Owner's Opposition To Motion in Support of Motion Regarding Collatera Estoppel Dated Jan. 10, 2024 From The United States Patent and Trademark Office Before the Patent Trial and Appeal Board, Re. Case PGR2022-00053 U.S. Pat. No. 11,157,256. (6 Pages).
Petitioner's Revised Reply to Patent Owner's Preliminary Response Regarding The Inapplicability of 35 U.S.C. § 325(d) and the Presentation of an Erroneous Claim Construction Dated Nov. 26, 2021 From the US Patent and Trademark Office Before the Patent Trial and Appeal Board Re. Case Case PGR2021-00096 U.S. Pat. No. 10,782,951. (10 Pages).
Petitioner's Sur-Reply in Opposition to Patent Owner's Contingent Motion to Amend Dated Sep. 12, 2022 From the US Patent and Trademark Office Before the Patent Trial and Appeal Board Re. Case PGR2021-00096 U.S. Pat. No. 10,782,951. (18 Pages).
Petitionor's Opposition To Patent Owner's Contingent Motion to Amend Dated Sep. 1, 2023 From The United States Patent and Trademark Office Before the Patent Trial and Appeal Board, Re. Case PGR2022-00053 U.S. Pat. No. 11,157,256. (33 Pages).
Preliminairy Guidance Patent Owner's Contingent Motion To amend Dated Sep. 29, 2023 From The United States Patent and Trademark Office Before the Patent Trial and Appeal Board, Re. Case PGR2022-00053 U.S. Pat. No. 11,157,256. (24 Pages).
Preliminairy Guidance Patent Owner's Motion To Amend Dated Jul. 20, 2022 From the US Patent and Trademark Office Before the Patent Trial and Appeal Board Re. Case PGR2021-00096 U.S. Pat. No. 10,782,951.(15 Pages).
Record of Oral Argument Held Virtually: Oct. 4, 2022 Dated Nov. 7, 2022 From the US Patent and Trademark Office Before the Patent Trial and Appeal Board Re. Case PGR2021-00096 U.S. Pat. No. 10,782,951. (79 Pages).
Reply in Support of Patent Owner's Contingent Motion To Amend Under 37 C.F.R. § 42.221 Dated Aug. 5, 2022 From the US Patent and Trademark Office Before the Patent Trial and Appeal Board Re. Case PGR2021-00096 U.S. Pat. No. 10,782,951. (19 Pages).
Almeroth Exhibit 1008—Expert Declaration of Kevin C. Almeroth in Support of Ironsource Ltd.'s, dated Jul. 25, 2022 from Case PGR2022-00053—Petition for Post-Grant Review of Claims 1-22 of U.S. Pat. No. 11,157,256 Dated Jul. 25, 2022 From the USPTO, Before the Patent Trial and Appeal Board. (149 Pages).
Almeroth Exhibit 1029—Second Expert Declaration of Kevin C. Almeroth Dated Aug. 23, 2023 From Case PGR2022-00053—Petitionor's Opposition To Patent Owner's Contingent Motion to Amend Dated Sep. 1, 2023 From the USPTO, Before the Patent Trial and Appeal Board (46 Pages).
Almeroth Exhibit 1034 and 2014—Expert Declaratiin of Kevin C. Almeroth (Corrected) PGR2022-00053, Dated Oct. 3, 2023. (46 Pages).
Almeroth Exhibit 1035—Third Expert Declaratiin of Kevin C. Almeroth PGR2022-00053, Dated Nov. 28, 2023. (42 Pages).
Almeroth Exhibit 2013—Remote Videotaped Deposition By Virtual Zoom of Kevin Christopher Almeroth, PH.D. Dated Jun. 1, 2023, From Case PGR2022-00053—Patent Onwner's Response To Petition for Post-Grant Review of U.S. Pat. No. 11,157,256 Dated Aug. 8, 2023 From the USPTO, Before the Patent Trial and Appeal Board (241 Pages).
Almerroth Exhibit 2016—Videoconference Deposition of Kevin Almeroth, vol. I, Dated Oct. 5, 2023 From Case PGR2022-00053—Patent Owner's Sur-Reply For Post-Grant Review of U.S. Pat. No. 11,157,256 Dated Oct. 13, 2023 From the USPTO, Before the Patent Trial and Appeal Board (184 Pages).
Android App Links Exhibit 1024—"Handling Android App Links", The Wayback Machine: 1-3, latest update Apr. 23, 2018 From Case PGR2022-00053—Petitionor's Opposition To Patent Owner's Contingent Motion to Amend Dated Sep. 1, 2023 From the USPTO, Before the Patent Trial and Appeal Board (3 Pages).
Android App Links Exhibit 1025—"Verify Android App Links / Android Developers", The Wayback Machine, 1-13, latest update Apr. 23, 2018 From Case PGR2022-00053—Petitionor's Opposition To Patent Owner's Contingent Motion to Amend Dated Sep. 1, 2023 From the USPTO, Before the Patent Trial and Appeal Board (13 Pages).
Android App Links Exhibit 1031—"Handling Android App Links", The Wayback Machine: 1-3, Nov. 9, 2023. (3 Pages).
Android App Links Exhibit 1032—"Verify Android App Links", The Wayback Machine: 1-23, Nov. 9, 2023. (14 Pages).
App Store Data Exhibit 1006—"App Store Data (2021)"—Business of Apps, May 13, 2021. by David Curry from Case PGR2022-00053—Petition for Post-Grant Review of Claims 1-22 of U.S. Pat. No. 11,157,256 Dated Jul. 25, 2022 From the USPTO, Before the Patent Trial and Appeal Board. (20 Pages).
Appeal Exhibit 1018—*Whitserve LLC*, Plaintiff-Appellant v. *Droppbox, Inc.*, Defendant-Appellee, Appeal From the United States District Court for the District of Delaware in No. 1:18-cv-00665-CFC, Decided Apr. 26, 2021 From the United States Court of Appeals for the Federal Circuit, Case 19-2334. from Case PGR2022-00053—Petition for Post-Grant Review of Claims 1-22 of U.S. Pat. No.

(56) References Cited

OTHER PUBLICATIONS 11,157,256 Dated Jul. 25, 2022 From the USPTO, Before the Patent Trial and Appeal Board. (13 Pages).
Ayers et al. Exhibit 1001—U.S. Pat. No. 11,157,256 from Case PGR2022-00053 Petition for Post-Grant Review of Claims 1-22 of U.S. Pat. No. 11,157,256 Dated Jul. 25, 2022 From the USPTO, Before the Patent Trial and Appeal Board. (29 Pages).
Ayers et al. Exhibit 1019—U.S. Pat. No. 10,782,951 issued to Ayers et al. from Case PGR2022-00053—Petition for Post-Grant Review of Claims 1-22 of U.S. Pat. No. 11,157,256 Dated Jul. 25, 2022 From the USPTO, Before the Patent Trial and Appeal Board. (29 Pages).
Casey Exhibit 1011—"Android Vs. iOS Development: Background Processing", LinkedIn, Jun. 27, 2016. from Case PGR2022-00053—Petition for Post-Grant Review of Claims 1-22 of U.S. Pat. No. 11,157,256 Dated Jul. 25, 2022 From the USPTO, Before the Patent Trial and Appeal Board. (6 Pages).
Cluskey Exhibit 1017—"Using Java Reflection", Oracle, Technical Article, 12 P., Jan. 1998. from Case PGR2022-00053—Petition for Post-Grant Review of Claims 1-22 of U.S. Pat. No. 11,157,256 Dated Jul. 25, 2022 From the USPTO, Before the Patent Trial and Appeal Board. (12 Pages).
Digital Turbine Exhibit 2009—"Redirection Definition", Jun. 17, 2004, From Case PGR2022-00053—Patent Onwner's Response To Petition for Post-Grant Review of U.S. Pat. No. 11,157,256 Dated Aug. 8, 2023 From the USPTO, Before the Patent Trial and Appeal Board (4 Pages).
Digital Turbine Exhibit 2010—"Redirections in HTTP", updated Apr. 10, 2023, From Case PGR2022-00053—Patent Owner's Response To Petition for Post-Grant Review of U.S. Pat. No. 11,157,256 Dated Aug. 8, 2023 From the USPTO, Before the Patent Trial and Appeal Board (10 Pages).
Digital Turbine Exhibit 2011—"Hypertext Transfer Protocol—Http/ 1.1", Semantics and Content: 1-88, Jun. 2014, From Case PGR2022-00053—Patent Onwner's Response To Petition for Post-Grant Review of U.S. Pat. No. 11,157,256 Dated Aug. 8, 2023 From the USPTO, Before the Patent Trial and Appeal Board.(88 Pages).
Digital Turbine Exhibit 2012—Declaration of Dr. Z. Morley Mao in Support of Patent Owner's Response, From Case PGR2022-00053—Patent Onwner's Response To Petition for Post-Grant Review of U.S. Pat. No. 11,157,256 Dated Aug. 8, 2023 From the USPTO, Before the Patent Trial and Appeal Board.(37 Pages).
Digital Turbine Exhibit 2015—Declaration of Dr. Z. Morley Mao in Support of Patent Owner's Revised Motion to Amend Dated Oct. 13, 2023 From Case PGR2022-00053—Patent Owner's Sur-Reply For Post-Grant Review of U.S. Pat. No. 11,157,256 Dated Oct. 13, 2023 From the USPTO, Before the Patent Trial and Appeal Board (19 Pages).
Digital Turbine Exhibit 2017—"Dictionary of Computer and Internet Terms", (vol. 1), Aug. 2016 From Case PGR2022-00053—Patent Owner's Sur-Reply For Post-Grant Review of U.S. Pat. No. 11,157,256 Dated Oct. 13, 2023 From the USPTO, Before the Patent Trial and Appeal Board (3 Pages).
Digital Turbine Exhibit 2018—Remote Deposition of Kevin Almeroth, PH.D., vol. I Dated Dec. 15, 2023 From Case PGR2022-00053—Patent Owner's Reply To Petitioner's Opposition To Patent Owner's Revised Motion To Amend Dated Dec. 22, 2023 From the USPTO, Before the Patent Trial and Appeal Board. (132 Pages).
Durbha et al. Petitioner's Opposition To Patent Owner's Revised Motion To Amend Dated Nov. 28, 2023—Exhibit 1040—"U.S. Pat. No. 8,839,376". (19 Pages).
Earlense et al. Exhibit 2001—"Android UI Deception Revisited: Attacks and Defenses", International Conference on Financial Cryptography and Data Security, Financial Cryptography and Data Security 2016: 41-59, Published Online May 17, 2017, From Case PGR2022-00053—Patent Owner's Preliminary Response to Petition for Post-Grant Review of U.S. Pat. No. 11,572,256 Dated Dec. 22, 2022 From the USPTO, Before the Patent Trial and Appeal Board (18 Pages).

Farm et al. Exhibit 1027—U.S. Pat. No. 9,348,572 to Farm From Case PGR2022-00053—Petitionor's Opposition To Patent Owner's Contingent Motion to Amend Dated Sep. 1, 2023 From the USPTO, Before the Patent Trial and Appeal Board (23 Pages).
Granting Institution Exhibit 1022—Institution Decision of the U.S. Pat. No. 10,782,951, PGR2021-00096, Paper 14 from Case PGR2022-00053—Petition for Post-Grant Review of Claims 1-22 of U.S. Pat. No. 11,157,256 Dated Jul. 25, 2022 From the USPTO, Before the Patent Trial and Appeal Board. (55 Pages).
Henry Exhibit 1016—U.S. Pat. No. 6,131,192 issued to Slivka et al. from Case PGR2022- 00053—Petition for Post-Grant Review of Claims 1-22 of U.S. Pat. No. 11,157,256 Dated Jul. 25, 2022 From the USPTO, Before the Patent Trial and Appeal Board. (18 Pages).
Hoffman Exhibit 2014—"Demonstrative Exhibit—Not Evidence", IronSource, Ltd. v. Digital Turbine, Inc. PGR2021-00096 U.S. Pat. No. 10,782,951, Fenwick & West: 31P., Oct. 4, 2022.
Liao Exhibit 1014—U.S. Pat. No. 9,800,609 issued to Liao from Case PGR2022- 00053—Petition for Post-Grant Review of Claims 1-22 of U.S. Pat. No. 11,157,256 Dated Jul. 25, 2022 From the USPTO, Before the Patent Trial and Appeal Board. (17 Pages).
Madden Exhibit 1007—"A Brief History of Deep Linking", Verizon Media, p. 1-9, Jun. 12, 2015 from Case PGR2022- 00053—Petition for Post-Grant Review of Claims 1-22 of U.S. Pat. No. 11,157,256 Dated Jul. 25, 2022 From the USPTO, Before the Patent Trial and Appeal Board. (4 Pages).
Mao Exhibit 1030—VIirtual Deposition of Dr. Zhuoqing Morley Mao Dated Aug. 7, 2023 From Case PGR2022-00053—Petitioner's Opposition To Patent Owner's Contingent Motion to Amend Dated Sep. 1, 2023 From the USPTO, Before the Patent Trial and Appeal Board (339 Pages).
Mao Exhibit 1038—vol. II 13 Depositition of Dr. Zhouqing Morley Mao Via Zoom Videoconference Dated Nov. 7, 2023 From The United States Patent and Trademark Office Before the Patent Trial and Appeal Board. (244 Pages).
Mao Exhibit 1039—Continued Depositition of Dr. Zhouqing Morley Mao Via Zoom Videoconference Dated Nov. 7, 2023 From The United States Patent and Trademark Office Before the Patent Trial and Appeal Board. (88 Pages).
Matthews et al. Exhibit 1012—U.S. Pat. No. 10,671,367 issued to Matthews et al. from Case PGR2022- 00053—Petition for Post-Grant Review of Claims 1-22 of U.S. Pat. No. 11,157,256 Dated Jul. 25, 2022 From the USPTO, Before the Patent Trial and Appeal Board. (20 Pages).
Molinet et al. Exhibit 1005—U.S. Published Patent Application No. 2016/0142859 to Molinet et al. from Case PGR2022- 00053—Petition for Post-Grant Review of Claims 1-22 of U.S. Pat. No. 11,157,256 Dated Jul. 25, 2022 From the USPTO, Before the Patent Trial and Appeal Board. (21 Pages).
Nabahi Exhibit 1015—U.S. Pat. No. 6,266,811 issued to Nabahi from Case PGR2022- 00053—Petition for Post-Grant Review of Claims 1-22 of U.S. Pat. No. 11,157,256 Dated Jul. 25, 2022 From the USPTO, Before the Patent Trial and Appeal Board. (14 Pages).
OAuth2 Exhibit 1028—"Authenticate to OAuth2 Services", The Waback Machine, 1-7, May 29, 2018 From Case PGR2022-00053—Petitionor's Opposition To Patent Owner's Contingent Motion to Amend Dated Sep. 1, 2023 From the USPTO, Before the Patent Trial and Appeal Board (7 Pages).
OAuth2 Exhibit 1033—"Authenticating to OAuth2 Services", The Wayback Machine: 1-9, Sep. 9, 2023.
O'Neil et al. Exhibit 1026—U.S. Pat. No. 9,760,723 to O'Neil et al. From Case PGR2022-00053—Petitionor's Opposition To Patent Owner's Contingent Motion to Amend Dated Sep. 1, 2023 From the USPTO, Before the Patent Trial and Appeal Board (28 Pages).
Pasha et al. Exhibit 1003—U.S. Pat. No. 10,353,686 issued to Pasha et al. from Case PGR2022- 00053—Petition for Post-Grant Review of Claims 1-22 of U.S. Pat. No. 11,157,256 Dated Jul. 25, 2022 From the USPTO, Before the Patent Trial and Appeal Board.
Prosecution History Exhibit 2002—Prosecution History of U.S. Appl. No. 15/903,054 From Case PGR2022-00053—Patent Owner's Preliminary Response to Petition for Post-Grant Review of U.S. Pat. No. 11,572,256 Dated Dec. 22, 2022 From the USPTO, Before the Patent Trial and Appeal Board (275 Pages).

(56) References Cited

OTHER PUBLICATIONS

Prosecution History Exhibit 1020—Prosecution history of U.S. Pat. No. 10,782,951 from Case PGR2022-00053—Petition for Post-Grant Review of Claims 1-22 of U.S. Pat. No. 11,157,256 Dated Jul. 25, 2022 From the USPTO, Before the Patent Trial and Appeal Board. (275 Pages).

Query Exhibit 1036—"Query—Definition", The Wayback Machine, 1-2, May 13, 2011. (2 Pages).

Query Exhibit 1037—"Query—Definition; What Does Query Mean?", The Wayback Machine: 1-2, (2 Pages).

Shapira et al. Exhibit 1010—U.S. Pat. No. 9,940,400 issued to Shapira et al. from Case PGR2022-00053—Petition for Post-Grant Review of Claims 1-22 of U.S. Pat. No. 11,157,256 Dated Jul. 25, 2022 From the USPTO, Before the Patent Trial and Appeal Board. (44 Pages).

Sogani Exhibit 1009—U.S. Pat. No. 10,296,641 issued to Sogani et al. from Case PGR2022-00053—Petition for Post-Grant Review of Claims 1-22 of U.S. Pat. No. 11,157,256 Dated Jul. 25, 2022 From the USPTO, Before the Patent Trial and Appeal Board. (54 Pages).

Wyatt et al. Exhibit 1023—U.S. Patent Pub No. 2017/03346853 to Wyatt et al. From Case PGR2022-00053—Petitionor's Opposition To Patent Owner's Contingent Motion to Amend Dated Sep. 1, 2023 From the USPTO, Before the Patent Trial and Appeal Board (46 Pages).

Yamada Exhibit 1004—U.S. Published Patent Application No. 2010/0095294 to Yamada et al. from Case PGR2022-00053—Petition for Post-Grant Review of Claims 1-22 of U.S. Pat. No. 11,157,256 Dated Jul. 25, 2022 From the USPTO, Before the Patent Trial and Appeal Board. (28 Pages).

Zhukov et al. Exhibit 1013—U.S. Pat. No. 8,732,827 issued to Zhukov et al. from Case PGR2022-00053—Petition for Post-Grant Review of Claims 1-22 of U.S. Pat. No. 11,157,256 Dated Jul. 25, 2022 From the USPTO, Before the Patent Trial and Appeal Board. (29 Pages).

* cited by examiner

INSTANT INSTALLATION OF APPS

RELATED APPLICATIONS

This application is a continuation of U.S. patent application Ser. No. 17/478,928 filed on Sep. 19, 2021, which is a continuation of U.S. patent application Ser. No. 16/992,194 filed on Aug. 13, 2020, now U.S. Pat. No. 11,157,256, which is a continuation of U.S. patent application Ser. No. 15/903,054 filed on Feb. 23, 2018, now U.S. Pat. No. 10,782,951. The contents of the above application are all incorporated by reference as if fully set forth herein in their entirety.

FIELD AND BACKGROUND OF THE INVENTION

The present invention, in some embodiments thereof, relates to installing software applications on devices and, more specifically, but not exclusively, to installing apps on mobile devices.

The use of apps on mobile devices such as cell phones is very widespread. Users frequently install new apps on their devices, providing the devices with new functionality such as access to new services, online shopping, gaming and more.

Many advertisement campaigns encourage users to buy and install apps on their devices. Typically, when a user viewing the ad is interested in installing a new app, the user clicks on a link. After the link is clicked, the device connects to an app store from which the new app may be downloaded. The user may obtain more information about the app by interacting with the app store. If at the end of this interaction the user is still interested in installing the app, the app is downloaded from the app store by clicking on another link.

A significant problem with this flow is poor ad conversion. The conversion problem arises when a user who indicated interest in installing the new app is redirected to an app store. This redirection interrupts user interaction with the current app and forces user attention to the app store, which may not be desired by the user. This often results in the user deciding not to install the new app or even to install a competing app advertised by the app store.

Additionally, fraud is a major issue in the mobile ad industry. Advertisers pay per conversion (e.g. ad click or app installation) and rely heavily on accurate ad attribution so that they are billed appropriately. Unfortunately, fraudulent parties have introduced malware practices to simulate ad clicks or intercept and replace referral IDs. These "click farms" can consume large advertising budgets with what look like impressive results but that actually amount to very little real user adoption/engagement. Honest advertisers are left paying commissions for such fraudulent activity.

SUMMARY OF THE INVENTION

Embodiments described herein utilize an installation client on a device in order to install apps on a device without redirecting the device to an app store. The content provided to the device includes links (denoted here "instant install links") which indicate that the associated app should be installed by the installation client and not via an app store. When an instant install link is selected, the installation client is invoked to run in the background. The installation client downloads the installation file for the app associated with the instant install link to the device. The new app may then be installed on the device using the installation file.

In optional embodiments, the installation client obtains user confirmation for installation and/or displays information relating to the instant installation process. These interactions between the installation client and the user may be designed to maintain user context by having minimal impact on the user experience in the current app. The user is therefore more likely to continue with installing the new app than if redirected to an app store because the current app remains in the foreground, and only minor (if any) further actions are required in order to install the new app.

Embodiments of the invention provide a technical solution to the problem of enabling users easy download of new software applications onto their devices while maintaining interaction with their current application (i.e. without connecting to an app store). The technical solution is to run an installation client in the background while the current app remains running in the foreground. Further interaction with the user relating to the installation process is processed by the installation client on the device, and is not forwarded to a different network element (e.g. app store server) for processing. In fact, any communication with an app store may be completely eliminated from the communication and operation flow. This solution is an improvement of the state current art, in which an additional connection must be established and maintained between the device and the app store in order to enable installation of the new app.

This simplification of communication and operations flow results in the following benefits:

a) Improved speed—There is no need for the device to connect to an app store or to wait for the app store to permit download and provide the installation file (or a link to the installation file). Pop-ups, banners, etc. may be generated by the installation client on the device and not received from the app store.

b) Improved usability—Minimal interaction is required from the user. The installation client runs in the background during download of the installation file and the installation itself, leaving the user free to continue with other activities without distraction.

c) Improved accuracy—The installation file may be downloaded by direct communication between the device and a software repository storing the installation files, without an intermediary such as the app store. By removing additional parties from the download process, connection errors and crashes are reduced.

d) Improved control—It is possible to control which network is used to download the installation file and enable/disable downloading on a specific network. Additionally, the installation file (e.g. APK) may be downloaded from different external storage (i.e. not the app store), making it is possible to install a specific version of the installation file which is targeted at a specific audience (versus the generic installation file available at the app store).

e) Improved interaction with third parties—The installation client may interact directly with other parties involved in building ad campaigns (e.g. an ad server), provide event notifications to the other parties, and provide information regarding user charges for the installation.

f) Fraud protection—The installation client provides a closed ecosystem which accurately and reliably traces the user funnel from click to install with completely accurate referral attribution. The installation client may be designed to follow industry-standard security and authentication protocols to safeguard against malicious attacks. This protection ensures that advertisers are only charged for the ad click and/or app install as appropriate.

As used herein, the term "device" means a network-connected device on which software is installed and runs. The term "device" includes both mobile devices (such as mobile phone, tablet, laptop, etc.) and non-mobile devices (such as smart TVs, desktop computers, network enabled devices, etc.).

As used herein, the terms "software application", "application" and "app" mean a software program installed (or to be installed) on a device.

As used herein the term "installation client" means an application running on the device and having the role of downloading and installing software applications on the device (e.g. installing an app on a mobile phone). The installation client may be a standalone client or a component of another client having additional functionalities. The installation client runs in the background for at least part of the time that it is active.

As used herein the term "installation file" means a file that after download to the device enables installation of the app on the device.

As used herein the term "automatically download" means that the installation file is downloaded by the installation client without closing the current app or moving the current app into background operation.

As used herein the term "app store" means a platform for receiving user instructions to install a software app and for making the installation file of the app accessible for download to the device. The app store is an external platform to which the mobile device is redirected by the current app. The app used to provide the user requests to the app store is optionally a dedicated app store app or a browser.

After being accessed by the device, the app store (e.g. dedicated app or web page displayed on a browser) remains running in the foreground of the device until the user actively exits the app store (for example by closing the dedicated app store app, returning to a previously-displayed webpage, opening a new app, etc.).

As used herein the term "app store" is not limited to platforms distributing apps for mobile devices, and includes platforms for distributing applications to mobile devices (e.g. mobile phones, tablets, laptop computers etc.) and/or to non-mobile devices (e.g. desktop computers, smart TVs, etc.). Examples of app stores for mobile devices include GOOGLE PLAY™, APPLE™ App Store and others.

According to a first aspect of some embodiments of the present invention there is provided a device adapted to run software applications. The device includes: a network interface adapted to communicate over a network, at least one non-transitory computer readable storage medium storing instructions and at least one processor associated with the network interface and the storage medium. The processor executes the instructions to:
  identify that a link for installation of a first software application is selected by user interaction with a second software application running on the device;
  in response to the identifying, invoke, without exiting the second software application, an installation client to run in the background on the device;
  instruct the installation client to automatically download an installation file of the first software application to the device over the network using the network interface; and
  using the downloaded installation file, install the first software application on the device.

According to a second aspect of some embodiments of the present invention there is provided a method for installation of software applications on a device. The method includes executing, by at least one hardware processor operating in the device, program instructions to:
  identify that a link for installation of a first software application is selected by user interaction with a second software application running on the device;
  in response to the identifying, invoke, without exiting the second software application, an installation client to run in the background on the device;
  instruct the installation client to automatically download an installation file of the first software application to the device over a network; and
  install the first software application on the device using the downloaded installation file.

According to a third aspect of some embodiments of the present invention there is provided a non-transitory computer readable medium including instructions that, when executed by at least one processor, cause the at least one processor to perform operations for installing software applications on a device. The operations include:
  identifying that a link for installation of a first software application is selected by user interaction with a second software application running on the device;
  in response to the identifying, invoking, without exiting the second software application, an installation client to run in the background on the device;
  instructing the installation client to automatically download an installation file of the first software application to the device over a network using a network interface of the device; and
  using the downloaded installation file, installing the first software application on the device.

In a first possible implementation of the first aspect or the second aspect or the third aspect the installation client is closed when the installation of the first software application is completed.

In a second possible implementation of the first aspect or the second aspect or the third aspect the installation client, upon being instructed to automatically download the installation file, downloads the installation file onto the device from a respective network address of the installation file. In a first possible implementation form of the second possible implementation of the first aspect or the second aspect or the third aspect the installation client retrieves the respective network address over the network from an app information server. In a second possible implementation form of the second possible implementation of the first aspect or the second aspect or the third aspect the installation client constructs the respective network address using information included in the link.

In a third possible implementation of the first aspect or the second aspect or the third aspect the automatic download maintains a user experience of interaction with the second software application.

In a fourth possible implementation of the first aspect or the second aspect or the third aspect the automatic download is performed without directing the user interaction to an app store.

In a fifth possible implementation of the first aspect or the second aspect or the third aspect the installation client is invoked when the link is a deep link linking the installation of the first software application to the installation client.

In a sixth possible implementation of the first aspect or the second aspect or the third aspect the device is a mobile device.

In a seventh possible implementation of the first aspect or the second aspect or the third aspect the installation client prompts for user confirmation of the installation of the first software application prior to the automatic download and performs the automatic download only when the confirmation is obtained. In a first possible implementation form of the seventh possible implementation of the first aspect or the second aspect or the third aspect prompting for user confirmation includes retrieving information associated with the first software application from a server over the network using the network interface and displaying the information on a display of the device. In a second possible implementation form of the second possible implementation of the first aspect or the second aspect or the third aspect the installation client resumes running in the background when a response is received to the prompting.

In an eighth possible implementation of the first aspect or the second aspect or the third aspect the device is redirected to an app store when the installation client is unavailable on the device.

In an ninth possible implementation of the first aspect or the second aspect or the installation client includes integrated security processes. In a first possible implementation form of the ninth possible implementation of the first aspect or the second aspect or the third aspect the integrated security processes perform at least one of: browser authentication, App authentication and deep link structure verification.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
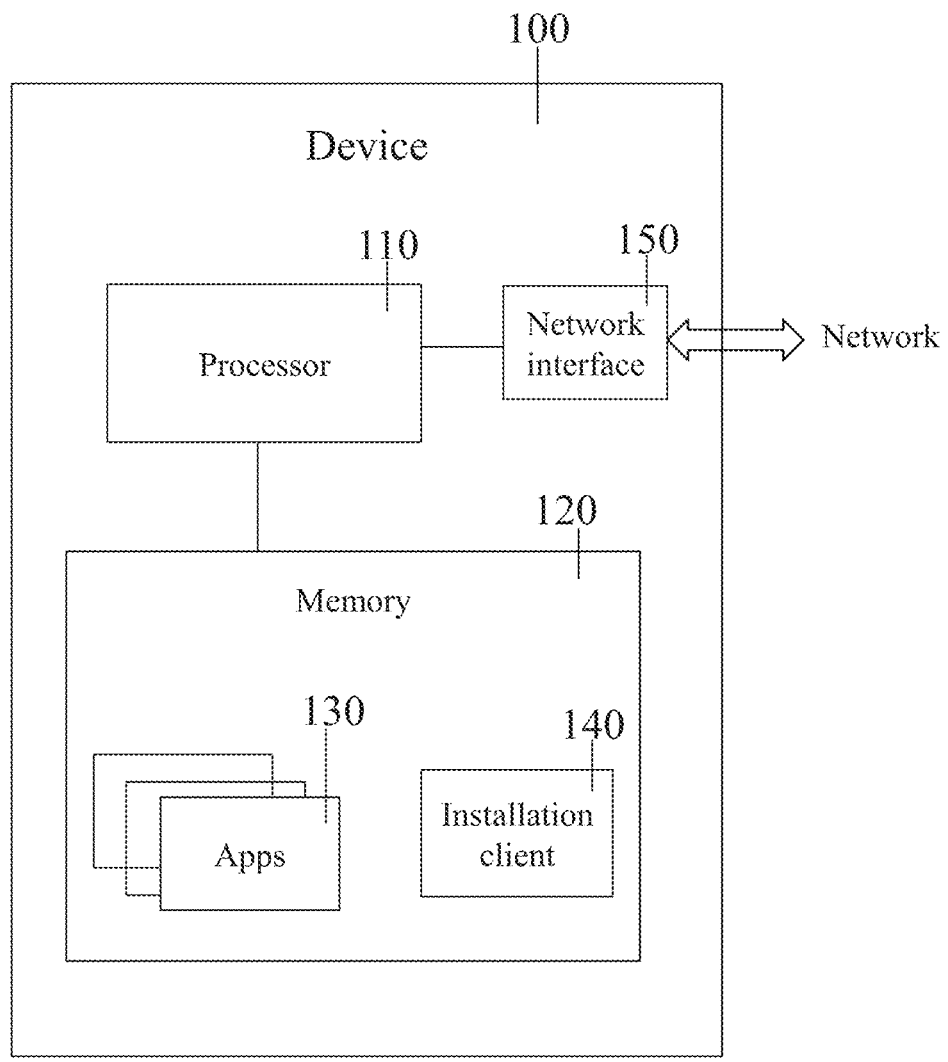
FIG. 1 is a simplified block diagram of a device for running software applications, according to embodiments of the invention.

The present invention, in some embodiments thereof, relates to installing software applications on devices and, more specifically, but not exclusively, to installing apps on mobile devices.

Two significant problems that arise in the sale and distribution of software applications are poor ad conversion and fraud. The conversion problem arises when a user who indicated interest in an app by tapping on a link is redirected to an app store. The user interaction with the current app or web page is interrupted, and the user is forced into interaction with the app store.

It is desired to provide a user-friendly solution to this problem, so that the user may easily install apps on a device without redirecting the device (and hence the user) to an app store. Embodiments presented herein utilize an installation client which is invoked to run on the device in the background when the user indicates a desire to download an app (for example by clicking on a link). The installation client performs the actions needed to download (and optionally to install the app) without connecting to an app store and/or opening an app store app.

Optionally the installation client performs one or more additional tasks, including but not limited to:
a) Obtaining user confirmation of the installation;
b) Displaying information relating to the app itself and/or the progress of the download and installation;

c) Installing the app on the device;
d) Creating a shortcut to the app on the device home screen; and
e) Launching the app.

Unlike app stores which force user attention away from current activities, the installation client may be adapted to maintain a convenient user experience. The installation client runs in the background, while the current app (which was used to select installation of the new app) may remain in the foreground until the user actively elects to switch to a different app and/or activity.

In some embodiments the installation client operates in the foreground during some of the instant installation process (e.g. to obtain user confirmation of the instant installation as described below). Optionally, while the installation client operates in the foreground a portion of the display screen shows the current app (possibly dimmed or otherwise obscured as illustrated in FIG. 2B), simulating a user experience of remaining in the context of the current app even during the brief period that the installation client runs in the foreground.

Optionally, during some of the instant installation process the installation client operates in notification mode. Notifications are displayed but no input is required from the user.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a device, a system, a method and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A. Device with Installation Client

Reference is now made to FIG. 1, which is a simplified block diagram of a device for running software applications, according to embodiments of the invention. As described in more detail below, installation client 140 is used to install a new app onto the device without going through an app store. Minimal interaction may be required from the user, and in some embodiments the automatic download and installation occurs after one click on a single link. Alternately or additionally, the first click on the link triggers additional actions including, but not limited to, displaying additional information about the app and/or obtaining user confirmation of the download (e.g. in a pop-up window and/or banner).

Device 100 includes at least one processor 110 and at least one non-transitory memory 120 storing code instructions to be executed by processor 110. Device 100 further includes network interface 150 which is used by the device when it communicates with external elements (such as the content provider) over a network. Optionally, device 100 is a mobile device.

Consider a user using an app (denoted herein the current app) running on device 100. The current app displays an "instant install" link (e.g. an ad containing a clickable link) for a different app (denoted herein the new app). When the user selects the "instant install" link in order to download the new app, installation client 140 is invoked to run in the background. The current app is not exited. The user may continue to use the current app without being aware that installation client 140 is now active in the background. Installation client 140 automatically downloads an installation file for the new app (e.g. an APK file). The installation file is used to install the new app on the device.

Optionally, installation client 140 runs continuously in the background, monitors links as they are selected and detects when a selected link is an instant install link (e.g. based on the link format and/or metadata associated with the link).

In response to being instructed to download the installation file, installation client 140 downloads the application file onto device 100.

Optionally, installation client 140 obtains address information (e.g. a link) to the installation file by one of:
a) Constructing the address using information present in the link (for example by retrieving the address for the app specified by the link from a non-transitory internal memory on device 100);
b) Querying an address repository (e.g. on an external server) over the network and receiving the address information in response to the query.

Optionally, installation client 140 (or a client in which it is embedded) performs the installation of the new app. Alternately or additionally, the new app is installed by different software running on device 100.

Optionally, installation client 140 is closed after the new app is installed. Alternately, installation client 140 is closed after download is complete and different software running on the device is triggered to install the new app.

As used herein the term "instant install link" means a link which when selected causes the installation client to become active in order to perform actions necessary to download and install an app. The instant install link indicates a specific app (or apps) which are to be installed when the instant install link is selected.

As used herein the term "the instant install link is selected" and corresponding terms mean receiving input indicating that the app specified by the instant install link should be downloaded and installed as described herein. The manner in which the selection is performed is based on the capabilities of the device and/or user interface and/or the current app. In one non-limiting example, the instant install link is selected by clicking on the instant install link (e.g. in a web browser). In a second non-limiting example, the instant install link is selected by selecting an item in a list and pressing an enter key.

Optionally, the selected link is a deep link which invokes the installation client to install new app. Further optionally, the deep link's format and/or metadata indicate which app should be installed by the installation client. In an exemplary embodiment, the installation client is registered for a dedicated link format which is not used by other types of applications/clients. When an instant install link having the registered format is selected, the only application on the mobile device able to handle the instant install link is the installation client. Thus the installation client is automatically invoked for every link having the registered format.

Optionally, an app and/or the device operating system and/or a client running on the device detect when the selected link is the installation client's deep link and invokes installation client 140.

Optionally, the automatic download maintains the user experience (UX) of interacting with the current software application. The user experience (UX) is typically based on interaction with the user interface input and output elements (e.g. touchpad, keyboard, display, etc.). By maintaining the UX in the current app, the user is not distracted by being forced into interaction with a different app or web page (such as an app store). The user is therefore more likely to continue with a simple, instant installation process as described herein.

The automatic installation is performed without directing user interaction to an app store. For example, when a user browsing a web page selects an instant install link, the user is not transferred to a different app store web page nor does a different app store application pop-up. The user stays in the current app and is not disturbed by an app store application.

Optionally, prior to the automatic download the installation client 140 prompts for user confirmation for installing the new app and performs the automatic download and installation only if confirmation is obtained. Optionally, this prompting includes obtaining information about the new app (e.g. retrieving information from a server on the network) and displaying the information. The displayed information may also include a link (or other indicator) which may be selected to confirm instant installation of the app. Further optionally installation client 140 resumes running in the background when the instant installation is confirmed (and optionally after a specified amount of time since the prompt).

Optionally, when an installation client is unavailable on a device, the device is redirected to an app store. Examples of situations in which an installation client is unavailable on a device include, but are not limited to:
 a) The installation client is not installed on the device;
 b) The incorrect version of the installation client is installed on the device; and
 c) Invocation of the installation client fails.
This redirection may be performed by other software installed on device 100 (e.g. by a different background client or by the current app).

As used herein, the term "redirected to an app store" means that user interaction using the device is shifted to a site and/or application for obtaining apps. Examples of redirection to an app store include, opening an app store home page in a browser, opening a specific app store web page for the new app in a browser and activating a dedicated app store application on the device.

FIGS. 2A-2E illustrate an exemplary series of views displayed during the course of the instant installation and confirmation process. In the present example the views are displayed on an integral device display 210. Alternately or additionally the views are displayed on an external display, such as a computer monitor.

Figure 2A:
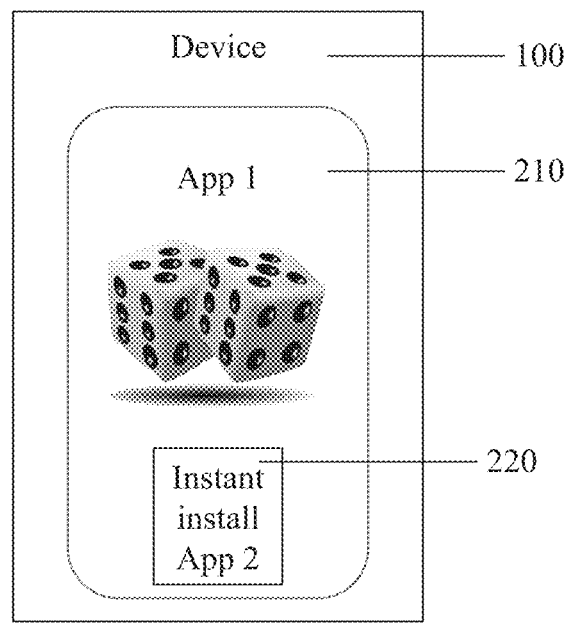
FIGS. 2A, 2B, 2C, 2D and 2E are an exemplary series of views displayed during instant installation of an app on a device.
Figure 2B:
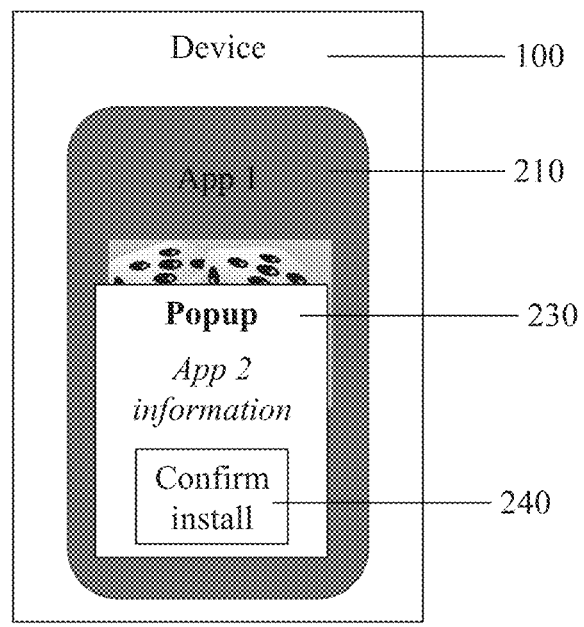
Figure 2C:
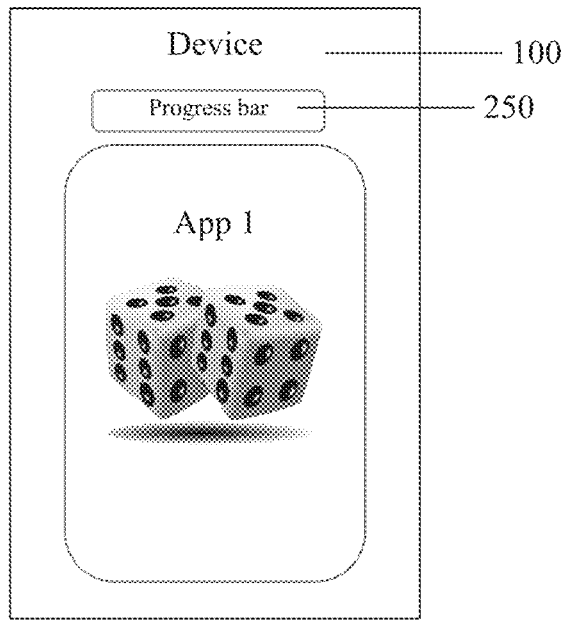
Figure 2D:
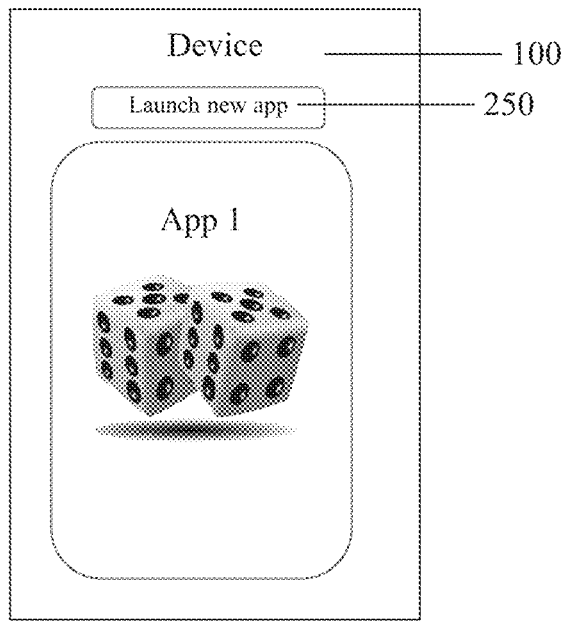
Figure 2E:
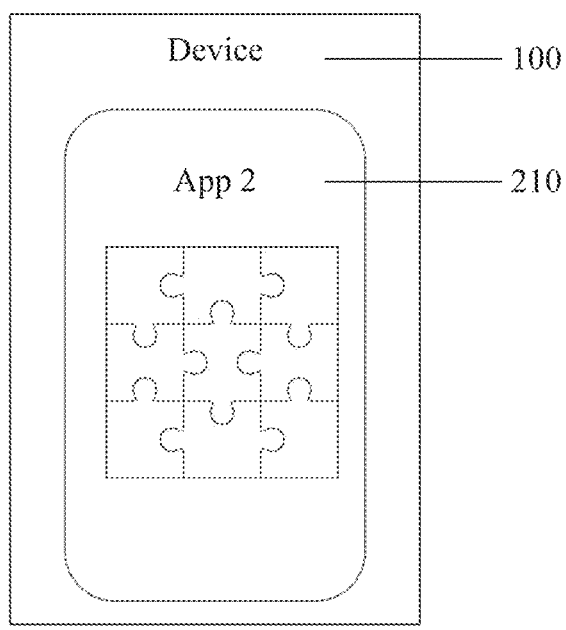

In FIG. 2A, device 100 displays the current app (denoted pp 1) which includes an instant install link 220 for a new app (denoted App 2). If the instant install link is selected, App 1 is dimmed and popup 230 appears as shown in FIG. 2B. Popup 230 includes information about App 2 and a confirmation link 240 which is selected to confirm that App 2 should be installed. After confirmation link 240 is selected, App 1 is displayed, popup 230 disappears and progress bar 250 indicating the progress of the installation is displayed as shown in FIG. 2C. After the installation is completed, progress bar 250 is replaced by launch bar 260 as shown in FIG. 2D. Launch bar 260 may be used to launch App 2 as shown in FIG. 2E.

In alternate embodiments in which user confirmation of the instant install is not required, the confirmation popup of FIG. 2B is not displayed. Alternately or additionally, one or both of the banners shown in FIGS. 2C and 2D are not displayed.

Optionally, a minimal series of views is displayed to the user. After instant install link 220 is selected, instant install link 220 disappears from the display and the device returns automatically to App 1. The new app is downloaded and installed in the background without further intrusion on the user activities on the device.

Referring back to FIG. 1, optionally some or all of the user interface is integrated into the device (e.g. a keyboard, touchpad, touch screen, etc.). Alternately or additionally, some or all of the user interface is external to the device (e.g. a wireless keyboard or mouse, external display, etc.).

For clarity, FIG. 1 shows a single memory 120. Alternately or additionally, device 100 includes multiple memories, each storing portions of the software code and/or data. Optionally, the code instructions on the memory or memories include code instructions for installation client 140. Optionally, the memory or memories include code instructions for additional software and/or firmware installed on the device, including but not limited to the device operating system and/or apps 130 installed on the device.

Figure 3:
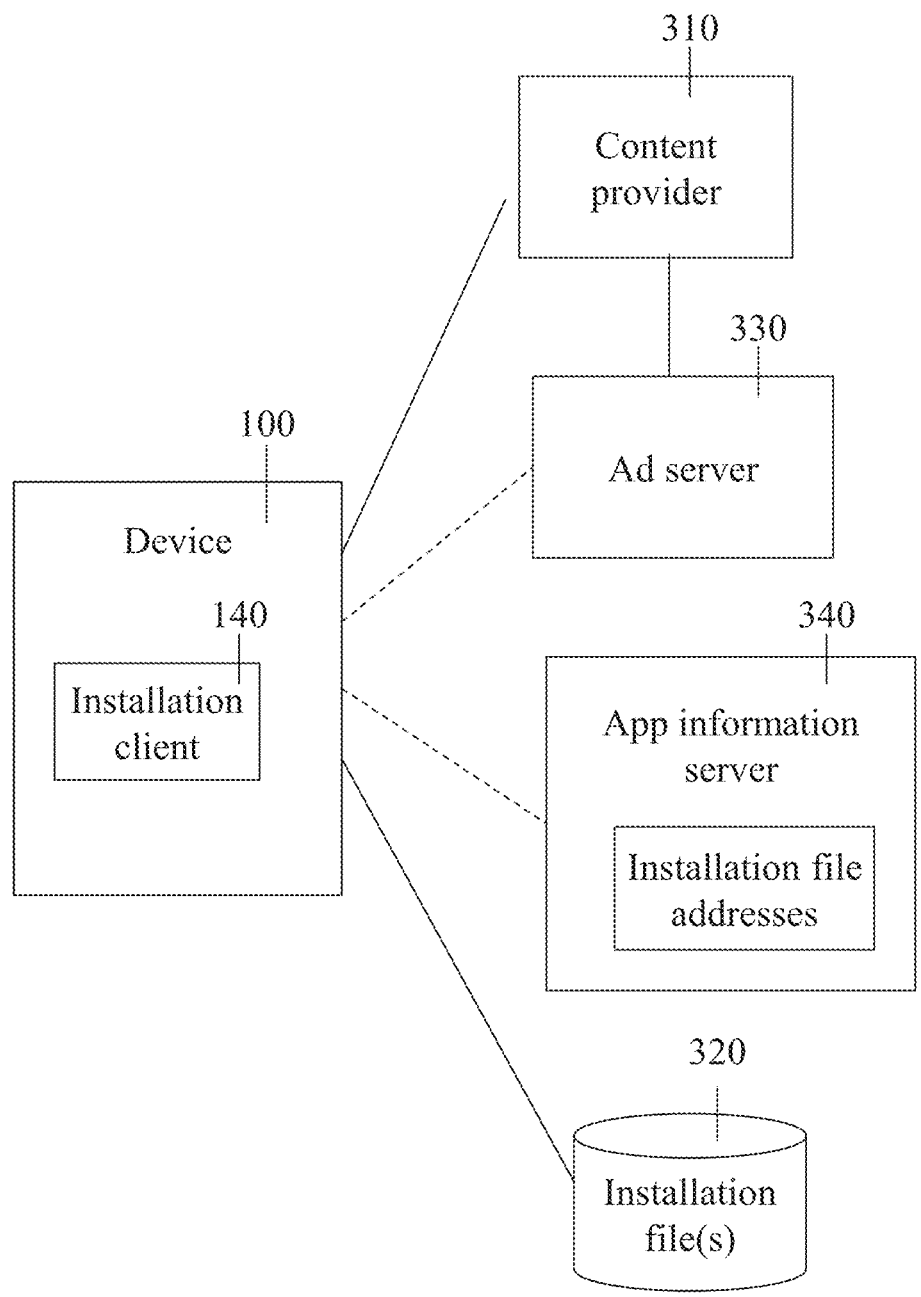
FIG. 3 is a simplified diagram of a system for installation of apps on a device, according to embodiments of the invention.

Reference is now made to FIG. 3, which is a simplified diagram of a system for installation of apps on a device, according to embodiments of the invention. Exemplary embodiments of such a system are described below (see FIG. 7).

Device 100 communicates with content provider 310 and installation file repository 320. Content provider 310 provides content with instant install link(s) to device 100. The instant install link may be part of an advertisement or ad campaign provided to content provider 310 by ad server 330. The advertisement may be displayed on a web page or by an app running on device 100.

Optionally, the instant install link is a deep link indicating that installation client 140 should be utilized for installing an app specified by the link. When an instant install link for a new app is selected, installation client 140 downloads the new app's installation file (e.g. APK) from installation file repository 320.

Optionally, device 100 also communicates over the network with ad server 330 and/or another backend element (such as App information server 340) in order to obtain information about the new app and/or a link or other address information for the installation file. The information about the new app may be displayed to the user, as illustrated in FIG. 2B. The link/address information may be used by installation client 140 in order to access the installation file on installation file repository 320.

Optionally, prior to providing the content to device 100, content provider 310 determines whether device 100 is enabled for instant install (also denoted an enabled device). A device is considered enabled for instant install if an installation client as described herein has been installed on the device and may be invoked when an instant install link is selected. Non-limiting examples of ways that content provider 310 may determine if a particular device is enabled for instant install include checking a device identifier against a list of enabled devices and/or using known information about the device (e.g. type of device, device operating system, etc.). An exemplary embodiment is described below (see FIG. 8).

Optionally, if the device is enabled, content provider 310 provides content with instant install link(s). Otherwise, the content is supplied with an ordinary link which redirects the device to the app store when selected.

In alternate embodiments, content provider 310 provides the content with an instant install link regardless of whether device 100 is or is not enabled. In cases where the device is not enabled for instant installation, the device is redirected to the app store by a backend element such as Ad server 330 or App information server 340.

Figure 4A:
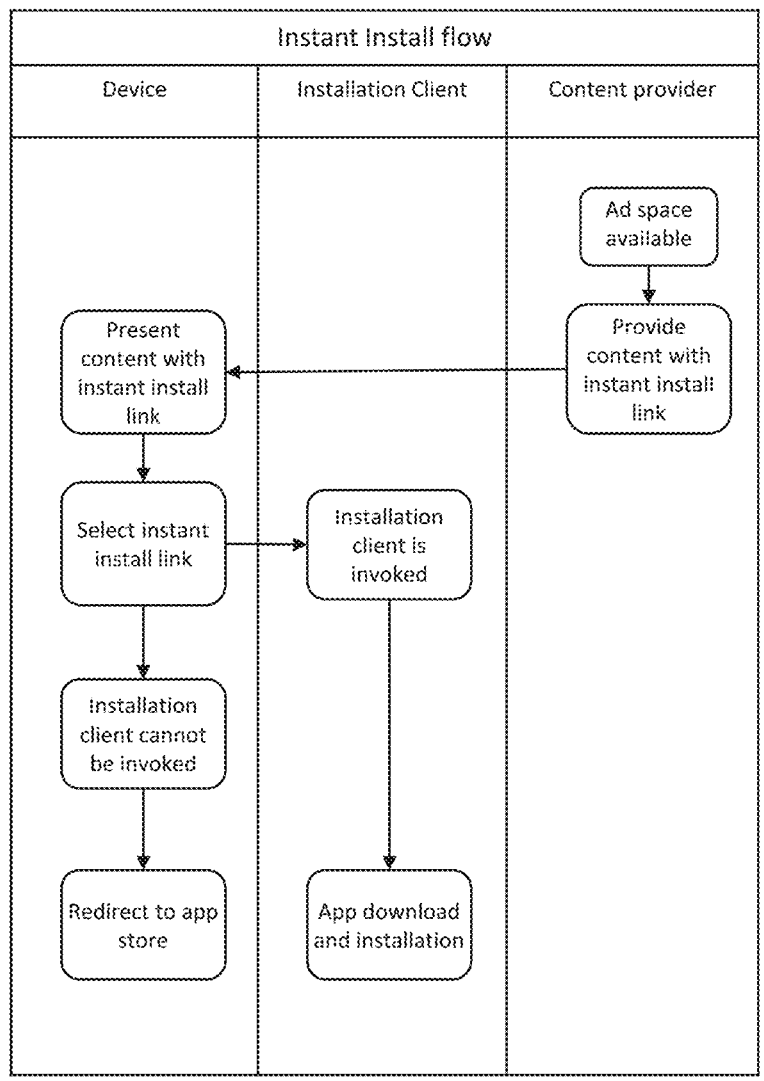
FIGS. 4A and 4B are simplified flow diagrams illustrating respective embodiments of the invention.
Figure 4B:
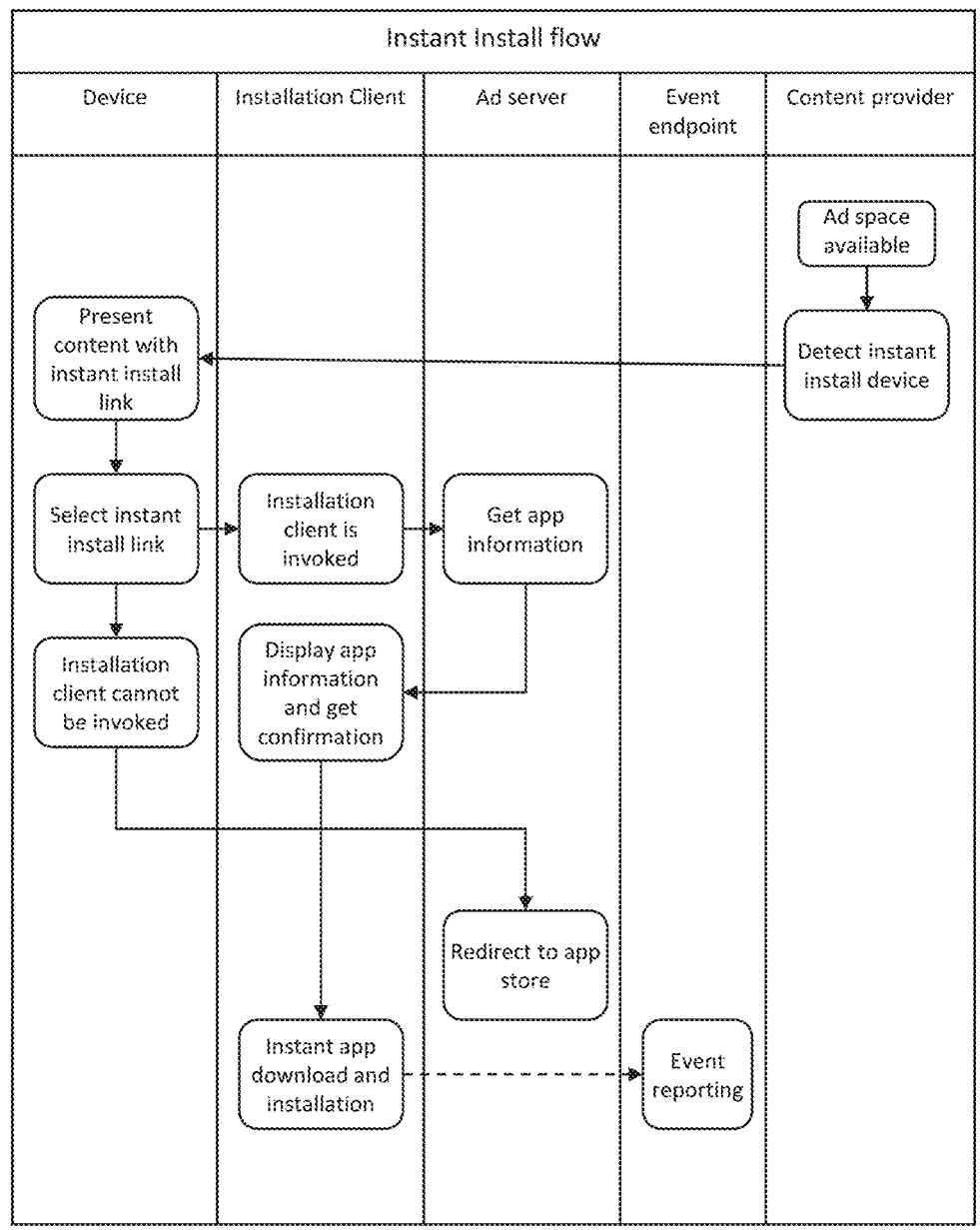

Reference is now made to FIGS. 4A and 4B, which are simplified flow diagrams illustrating respective exemplary embodiments of the invention.

In the exemplary embodiment of FIG. 4A, the content provider provides content which includes an instant install link to the device. The provided content is displayed on the device (including the instant install link). When the instant install link is selected the installation client is invoked. The installation client automatically downloads and, optionally installs, the new app. When the instant install link is selected and the installation client cannot be invoked, the device is redirected to the app store.

The exemplary embodiment of FIG. 4B is similar to that of FIG. 4A but additionally includes:
i) Detecting whether the device is enabled for instant install. If the device is enabled the content provider provides content with an instant install link. If the device is not enabled for instant install (not shown) the content provider may provide content with a differently formatted link.
ii) Interaction with an Ad server in order to obtain information about the new app. The information optionally includes a link for downloading the new app.
iii) Getting confirmation before the new app is downloaded.

As in FIG. 4A, the content provider provides content which includes an instant install link to the device. When the instant install link is selected and the installation client is invoked, app information is obtained from an Ad Server and is displayed. When the download is confirmed (e.g. by the user selecting a confirmation link), the new app is downloaded and installed by the installation client. When the instant install link is selected and the installation client cannot be invoked, the device is redirected via the Ad server to the app store.

Optionally, the installation client also performs event reporting to an event endpoint. FIG. 4B shows the non-limiting example of event reporting after instant installation of the app (see dashed arrow at bottom of figure). Event reporting may be performed by the installation client at other times in the instant download process and about various types of events (e.g. selection of instant install link, confirmation or non-confirmation of instant install, success or failure of instant installation, timing between selections, etc.).

B. Methods for Instant Installation of Apps

Figure 5:
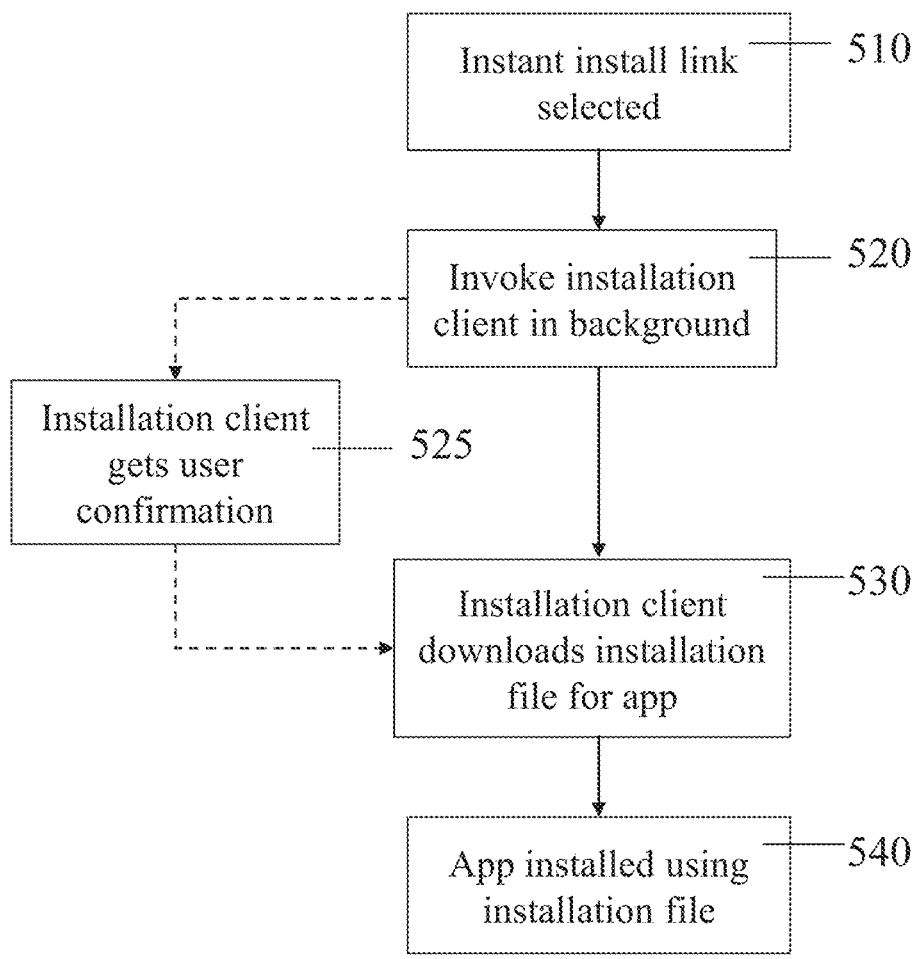
FIGS. 5 and 6 are simplified flowcharts of methods for installing software applications on a device, according to respective embodiments of the invention.

Reference is now made to FIG. 5, which is a simplified flowchart of a method for installing software applications on a device, according to embodiments of the invention. The method is implemented by at least one hardware processor executing code in the device.

In 510, a link for installing a new app is selected. The selection is made by user input into the currently active app (e.g. clicking a link in an open web browser). Optionally, the link is a deep link which indicates that the new app should be installed by an installation client.

In response to the identification, in 520 the installation client is invoked to run on the device in the background. The current software application is not exited.

In 530 the installation client is instructed to automatically download an installation file of the new software application to the device. In 540 the new software application is installed on the device using the downloaded installation file.

Optionally, in 525 user confirmation is obtained prior to download. The automatic download is performed only if the confirmation is obtained.

Optionally, the installation client is closed after the new app is installed. Alternately, the installation client is closed after the download is completed and different software running on the device is triggered to install the new app.

Figure 6:
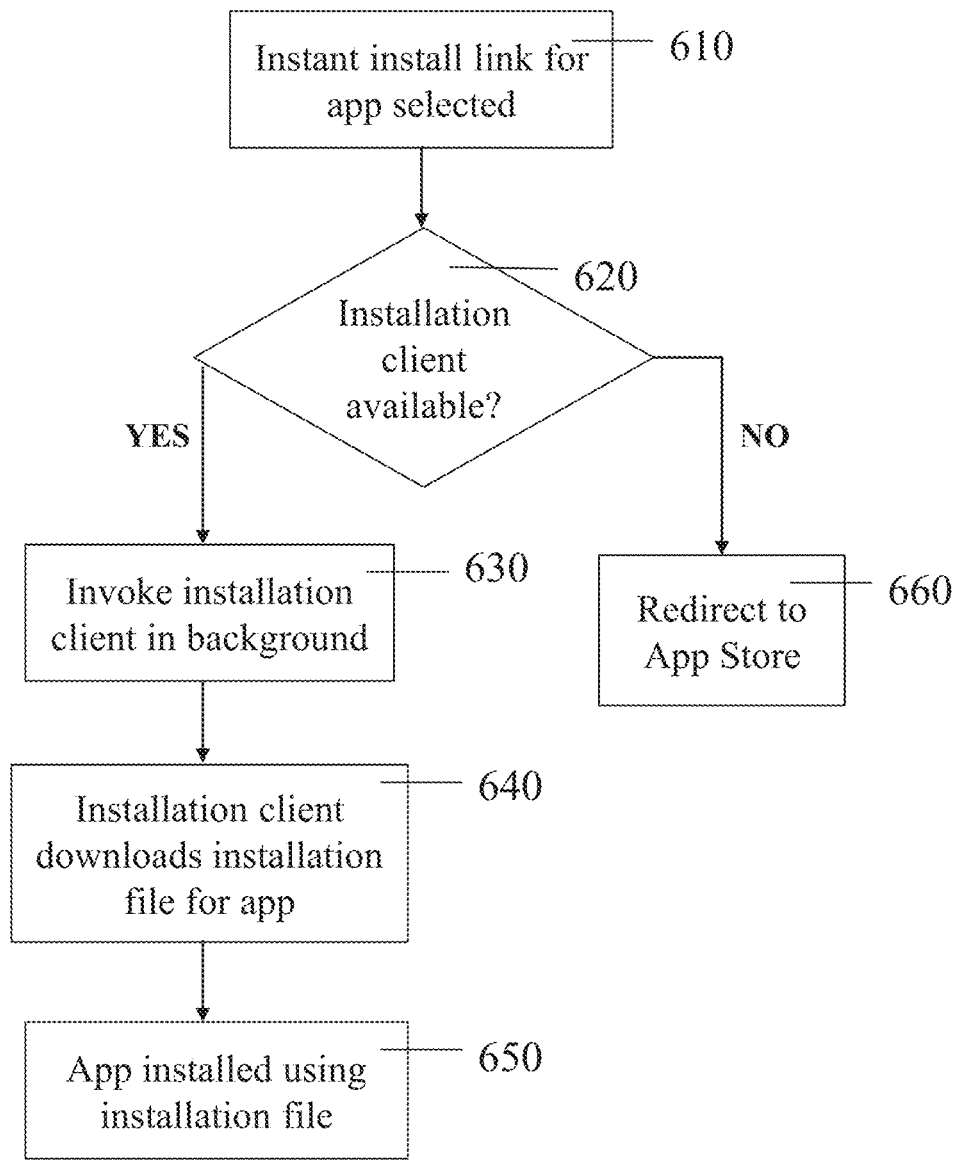

Reference is now made to FIG. 6, which is a simplified flowchart of a method for installing software applications on a device, according to embodiments of the invention.

In 610, selection of an instant install link is identified. Optionally, the link is a deep link linking installation of the new app to the installation client.

In 620, it is determined whether an installation client is available and can be used for instant installation of the new app.

If an installation client is available, in 630 the installation client is invoked to run on the device in the background. The current software application is not exited. In 640 the installation client downloads an installation file for the new app to the device. In 650 the new software application is installed on the device using the downloaded installation file.

If an installation client is not available, in 660 the device is redirected to an app store.

Optionally, the automatic download maintains the user experience (UX) of interacting with the current software application as described above.

Optionally, the automatic download is performed without directing user interaction to an app store as described above.

Installation Client

Figure 7:
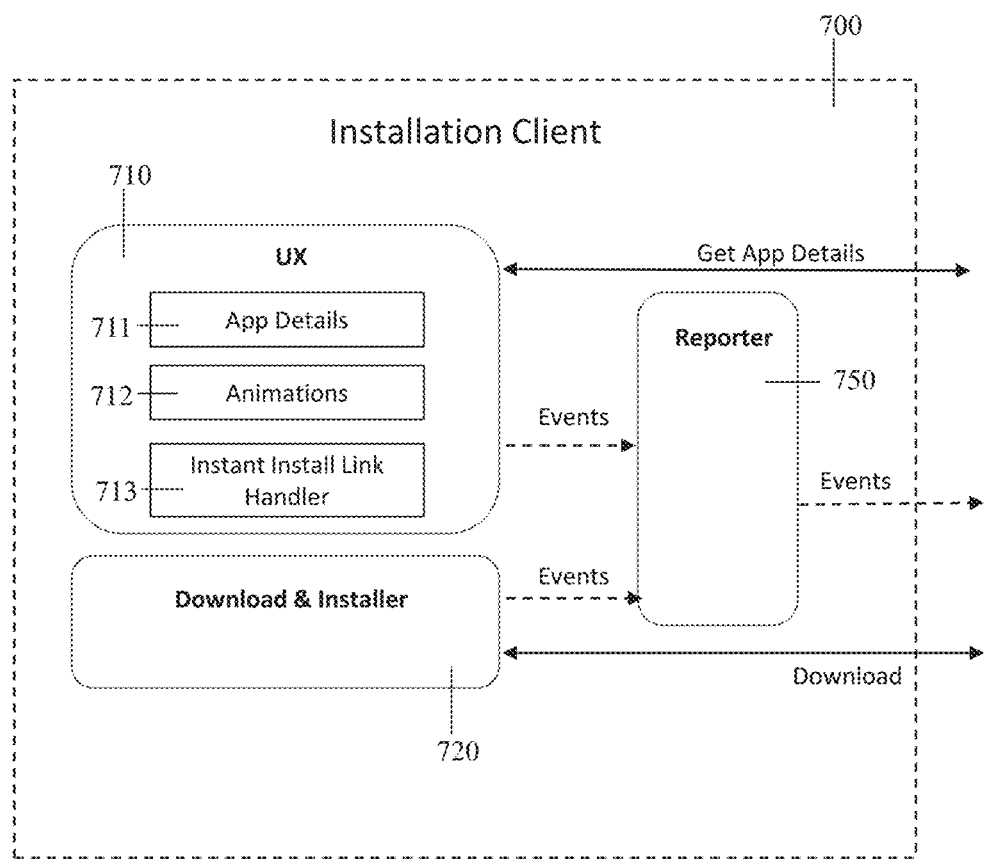
FIG. 7 is a simplified schematic diagram of an installation client according to embodiments of the invention.

Reference is now made to FIG. 7, which is a simplified schematic diagram of an installation client according to an exemplary embodiment of the invention. Installation client 700 is represented as several modules performing separate functions. The division of functionality demonstrated in FIG. 7 is illustrative, and not intended to be limiting. Other embodiments of an installation client may organize the various functions performed by installation client 700 in a different manner.

UX 710 handles interaction with user, by receiving inputs from the device's user interface and providing output for the user (e.g. on a display and/or by device vibration). UX 710 functionality includes but is not limited to:
App Details 711—Provides app details for display (e.g. prior to instant installation of the app);
Animations 712—Handles animations for display; and
Instant install link handler 713—Handles operations when an instant install link (e.g. a deep link) is selected via the device's user interface. For example, instant install link handler 713 may cause App Details 711 to contact an ad server to obtain details about the new app and/or trigger Download & Installer module 720.

Download & installer 720 downloads and installs the new app when the instant install link is selected (for example by downloading the respective APK file from external storage (such as a content delivery network or cloud storage such as Amazon Web Services) and installing the new app using the downloaded APK file).

Optionally, installation client 700 includes reporter 750 which monitors events occurring in the installation client. Reporter 750 issues event notifications which notify other device and/or network-connected components of events occurring in installation client 700. Examples of events include but are not limited to:
i) Clicks on links;
ii) User confirmation to install app;
iii) Successful download;
iv) Successful install;
v) Failure events; and vi) Status/monitoring events describing the status of various activities in the flow (e.g. download started, download finished, installation started, etc.).

Security Measures

Optionally the installation client includes integrated security measures that authenticate the instant install link when the installation client is invoked, in order to prevent malicious use of instant installation capabilities Examples of security measures which may be integrated into the installation client include but are not limited to:
A) Browser authentication (denoted SSL Pinning)—Prevents 'man in the middle' attacks for server calls. Browser authentication prevents the installation client from communicating with an unauthorized server, and is performed as follows. The server is configured to use HTTPS protocol and has an SSL certificate installed on it. The installation client has a record of the server's digital certificate. On every call to the server the installation client first validates that the server's certificate matches the one that exists on the installation client and only on success continues the communication.
B) Banner served through an app (denoted App authentication)—Identifies if a particular app is eligible to display instant install links and use the installation client capabilities. In order to be eligible the App registers with a server and is provided upon registration with a unique app-eligibility token. The app-eligibility token is then made available for use with that particular app. The app needs to enable the token through the operating system whenever displaying an instant install link. The installation client, upon receiving an instant install link, checks the eligibility of the caller and if identified as eligible continues the process of downloading the app.
C) Deep link structure verification—Allows an app to designate itself as the default handler of a given type of HTTP deep link. A Digital Asset Links JSON file is added on the server. When an HTTP deep link is invoked on the device, the operating system verifies if there is a domain structured as the deep link domain that exists in the web and has a relevant certificate. Whenever a deep link is selected on a device, the operating system validates if such website exists and has the relevant certificate.

C. Detection of Instant Install Enabled Devices

It may be desired by that content with instant install links be provided only to devices enabled for instant installation. For example, an ad on a webpage provided to an enabled device will include a deep link to the installation client, whereas for a non-enabled device the same ad on the same webpage will have a link to an app store. Additionally, the provided content may be tailored to the instant installation process in order to provide a positive user experience and/or to allow a smooth transition between selecting the instant install link and downloading the new app.

Figure 8:
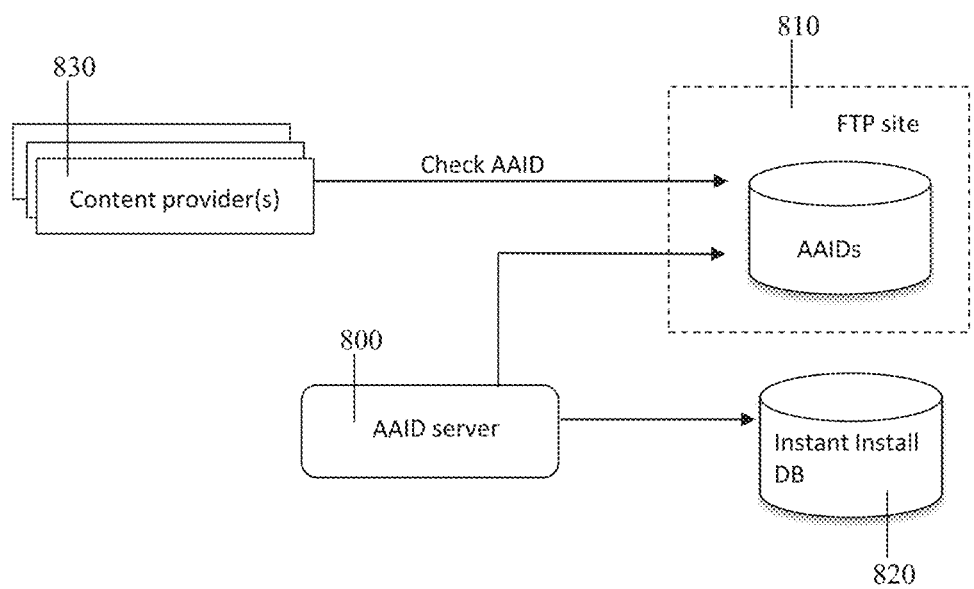
FIG. 8 is a simplified block diagram of a system for determining whether a device is enabled for instant installation, according to embodiments of the invention.

Reference is now made to FIG. 8, which is a simplified block diagram of a system determining whether a device is enabled for instant installation, according to embodiments of the invention. The determination is made based on an identifier uniquely identifying a specific device (e.g. an AAID).

AAID server 800 manages AAID database on an FTP site 810. Instant install database 820 maintains a list of AAIDs of devices enabled for instant installation of apps. AAID server 800 monitors instant install database 820 and provides up to date information about the enabled devices to the FTP site 820. Prior to providing content to a device, content provider 830 checks the device's AAID against the up-to-date information at FTP site 820 and determines whether the device is enabled for instant installation. If the device is enabled, content provider 830 provides the content with instant install link(s).

D. Exemplary System for Instant Installation of Apps

Figure 9:
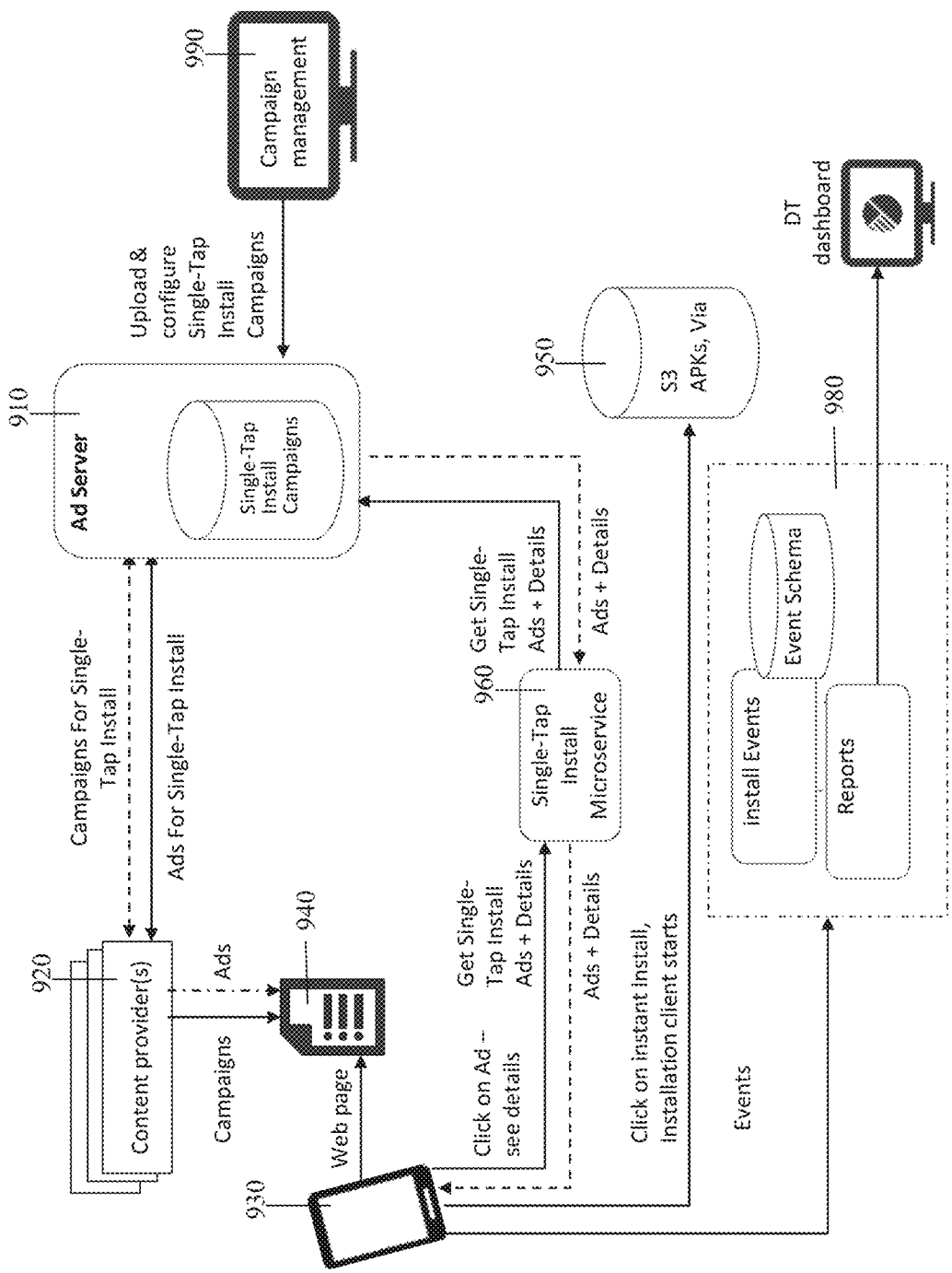
FIG. 9 is a simplified system diagram of a system for instant installation of apps on a device, according to exemplary embodiments of the invention.

Reference is now made to FIG. 9, which is a simplified system diagram of a system for instant installation of apps on a device, according to exemplary embodiments of the invention. For purposes of explanation the instant install link is described as an ad on a web page displayed on the device. However it is to be understood that the system configuration described herein is suitable for any content provided with an instant install link (e.g. a link embedded in the current app). For convenience, the term "Single-Tap Install" is used to indicate an ad/ad campaign which supports instant installation of apps as described herein.

Ad server 910 stores Single-Tap Install™ ad campaigns which include instant install links in the ads. The ads/ad campaigns are provided to ad server 910 by any suitable form of ad campaign management.

Content provider 920 obtains information about ad and/or ad campaigns from ad server 910. When device 930 downloads web page 940 via content provider 920, content provider 920 checks whether web page 940 should be provided as a Single-Tap Install ad (i.e. with an instant install link) or as a regular ad. When the link in the Single-Tap Install ad is selected, the installation client on device 930 obtains the respective installation file from database 950 (i.e. the installation file repository).

Optionally, the installation client on device 930 obtains additional details relating to the instant installation directly from ad server 910 and/or using a dedicated Single-Tap Install™ microservice 960. These details may be displayed, for example, in a pop-up or banner requesting confirmation of the instant installation.

Optionally, device 930 provides event notifications to event endpoint 980 which may process the event notifications to create reports, to analyze the effectiveness of ad campaigns and for other purposes.

Self-service portal 990 may be used by media buyers to configure ad campaigns to be used with Single-Tap Install™. At the end of the process an instant install deep link is provided.

Application programming interfaces (APIs) may be available to assist in developing and monitoring campaigns and implementing instant installation. Examples include:
a) External Campaign-Setup/Ad-Configuration API for configuring campaigns programmatically server to server;
b) Campaign Status Sync API for providing information on on-going campaigns to media buyers/advertisers.
c) Eligibility API for determining in real-time if a specific device and/or carrier are enabled/eligible for Single-Tap Install functionality. The Eligibility API enables serving content with instant install links only to eligible devices.

Optionally, the device has an installed browser which displays the instant install link (e.g. banner ad). If a suitable installation client is not on the device, the browser intercepts the instant install link and redirects to the App Store.

Optionally, the installation client handles the instant install deep link, retrieves campaign metadata from the Ad Server and displays a user interface for downloading the campaign. It also communicates with network elements to download/install apps and/or to report events back to the Event Endpoint.

Optionally, the Ad Server is a backend service responsible for delivering sponsored ad campaigns and associated metadata (description, category, ratings, screencaps, etc) to the installation client. Optionally, also manages advertiser budget requirements and captures campaign conversion metrics (banner clicks>installs>opens).

Optionally, the Event Endpoint is a dedicated backend endpoint for processing and storing all reporting events provided by installation client(s) on devices enabled for instant install.

D.2. Instant Install Flow

Figure 10:
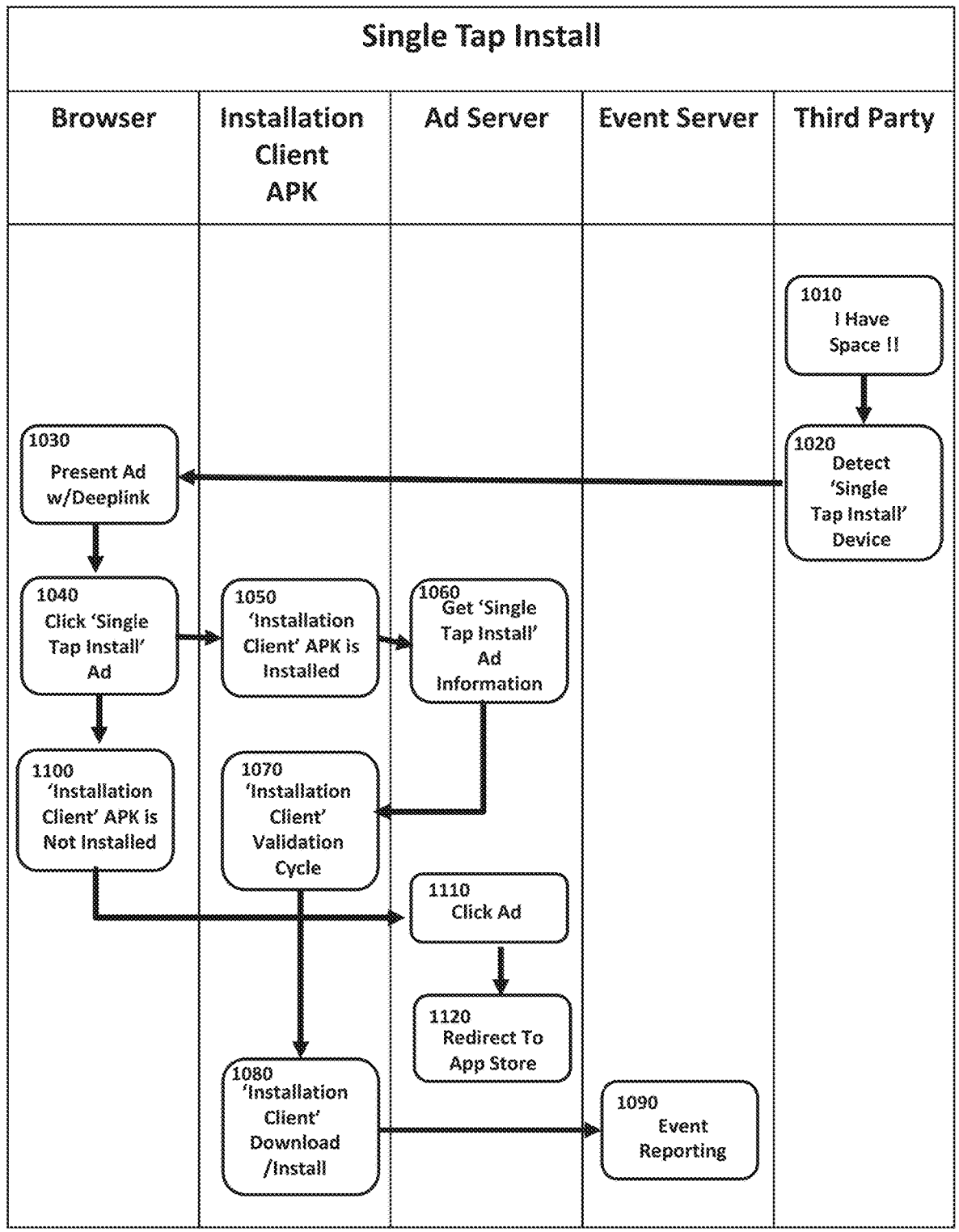
FIG. 10 is a simplified flow diagram illustrating an exemplary embodiment of the invention.

Reference is now made to FIG. 10, which is a high-level flow diagram illustrating an exemplary embodiment of the invention. For the purposes of FIG. 10, the content is presented as a web page with ad in an Android browser.

- 1010—Media Buyer (denoted "Third party" in FIG. 10) has a banner to be served to a device (won a bid on an exchange, etc).
- 1020—The third party makes detects if the device is enabled for instant install, for example by targeting a preapproved category of devices (e.g. by device make/model/OS/carrier) or by referencing an AAID lookup (as described for FIG. 8).
- 1030—If the device is enabled, the third party presents the banner with an embedded deep link (instead of the app store URL).
- 1040—User sees the banner, clicks on the deep link:
- 1050—The deep link initiates the installation client and passes in necessary information about the campaign.
- 1060—Installation client calls the Ad Server directly with the appropriate campaign ID. Ad Server looks up the campaign and returns all necessary app metadata to populate the user interface (UI).
- 1070—Installation client validation cycle. The installation client displays an App Details modal UI with campaign details, screenshots, legal disclaimers and an 'instant install' CTA. User taps install.
- 1080—App download/installation begins. App Notifications inform the user of download/installation progress. Once installation is complete, the installation client fires a tracking URL for proper advertising attribution along with an app notification—'tap to open the app'—to increase user engagement.
- 1090—Events on all of the above are sent to the Event Endpoint.

An alternate flow occurs if the device does not in fact have an installation client or if the installation client does not respond to the deep link click:

- 1100—Single-Tap Install ad is clicked but installation client is not available.
- 1110—The ad click is forwarded to the Ad Server.
- 1120—The device is redirected to the app store (e.g. Play Store).

D.3. User Experience

The user experience begins when an end user on an enabled device sees an instant install link (e.g. display banner in a mobile app or mobile web experience).

Exemplary stages of the user experience are now presented.

D.3.i) User Taps Banner

A dark overlay is displayed to provide appropriate user feedback (see FIG. 2B). A 'loading' indicator is additionally displayed if there is any lag between banner tap and display of the subsequent modal UI. During this sequence, the installation client makes an Ad Server request to retrieve campaign details and the APK download URL. The installation client displays application details in a modal. The modal includes relevant app information such as: the app icon, app name, number of downloads, APK size, average user rating, truncated app description and screencaps. App description includes lines of text and a SHOW MORE link to reveal the full description. Additionally, the modal may include a link to both/either the Advertiser and/or Carrier's Terms of Use and Privacy Policy for legal compliance. Optionally, carrier branding may be added to the App Details Modal.

Call-To-Actions and Behaviors:
- a. INSTALL—Tap 'Instant Install' to initiate download/installation process.
- b. EXIT—Tap native back key or outside modal (curtain, anywhere in semi-transparent background) to close the modal.
- c. TERMS OF USE—optional text, tap to full browser, hidden if not specified.
- d. IMAGES—Horizontal swipe to scroll, on tap open full screen view.
- e. SHOW MORE—tap to see expanded description, view all required permission details. Also reveals link to app store page

D.3.ii) User Taps Instant Download

Installation client automatically begins downloading the app in the background and the App Details modal is closed. User sees a standard app notification displaying download progress (see FIG. 2C). The download app notification includes a message header, message body, progress bar, % completion and app icon. Once download is complete, the download notification is replaced by an install progress app notification. The install app notification includes a message header, message body, and app icon. If the download is interrupted, it will resume or retry per defined business logic.

Call-To-Action and Behaviors:
- a. Download and Install App Notifications are non-actionable; no action occurs when they are tapped.

D.3.iii) Post Install 'Open' Prompt

The app is installed to the device and a shortcut is placed on the user's home screen. After successful installation, the installation client fires the click proxy URL and appends a referrer ID for proper ad attribution. User sees an app notification prompting the user to begin interacting with the target app (see FIG. 2D). The open app notification includes a message header, message body, progress bar, % completion and app icon.

Call-To-Actions and Behaviors:
   a. Tap the notification to immediately launch the app to the home activity.

D.4. Download Retry Logic

If the network connection changes or drops during the course of the installation file download, the installation client pauses the download and resumes when a valid network connection is reestablished. If download fails due to checksum mismatch, the installation client immediately fires a 'download failed' app notification encouraging user to 'tap to retry' the download. Tapping will restart the download from scratch. If download fails for any other reason, the installation client will retry several times before firing the same 'download failed' notification.

D.5. App Store Fallback

The installation client provides a fallback mechanism if a user taps the banner and the installation client is not on the device or if the installation client is an older version that does not support current instant installation functionality. Tapping the banner fires the deep link URL which is a standard https URL. If the installation client is on the device, it will intercept the request and append various parameters to the deep link in order to display the appropriate info in the app details modal. If the installation client is not on the device, the browser will hit this URL to perform an Ad Server GetAds request. The response will include a preprogrammed App Store redirect URL. The web browser opens the redirect URL and displays the App Store page.

D.6. Error Handling

I) No Network:
If the network connection is lost while user is viewing the App Details modal and is not established within a specified amount of time (e.g. five seconds), a "no network connection" message will be presented. Tapping the 'install' call-to-action will have no affect while there is no available network connection. If the network connection is lost while download is in progress, the installation client will pause the download and resume per a specified download retry logic.
II) Crash:
An operating system crash or installation client crash may interrupt the user experience and download progress. Under conditions in which a crash might occur, the installation client automatically retries installing any apps whose installation progress was interrupted by the crash. On resume after the crash, the installation client does not relaunch the app automatically to the last activity.
III) Out of Storage:
The installation client assesses the device's available storage immediately after a user taps the 'install' button. When the device has insufficient storage, a warning dialogue, prompting the user to delete files and create room, is displayed for any application that would exceed the device's storage capacity.

D.7. Security Processes

Figure 11:
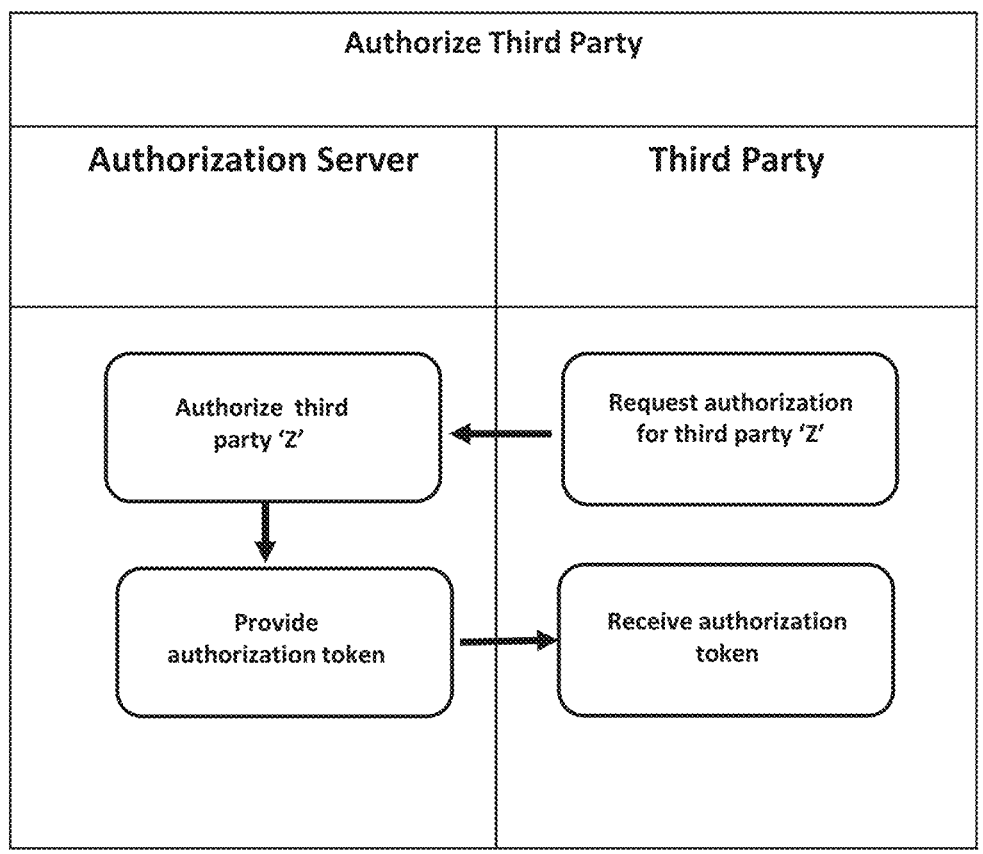
FIG. 11 is a simplified flow diagram illustrating a pre-authentication service, according to exemplary embodiments of the invention.
Figure 12:
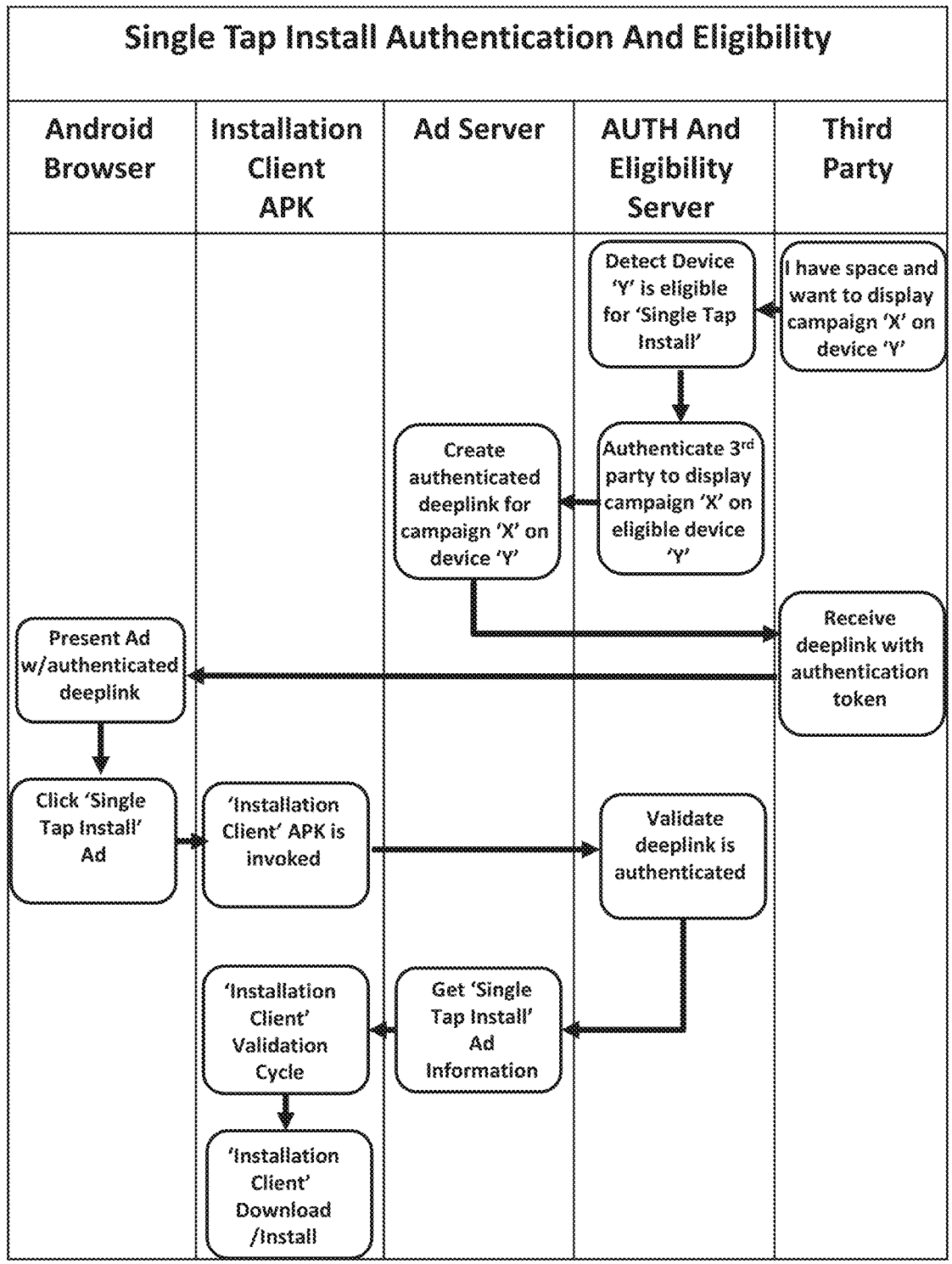
FIG. 12 is a simplified flow diagram illustrating per-request authentication and eligibility services, according to exemplary embodiments of the invention.

FIGS. 11 and 12 illustrate authentication and eligibility processes which may be integrated with the installation client.
FIG. 11 is a simplified flow diagram illustrating a pre-authentication service, according to exemplary embodiments of the invention. The pre-authentication service authenticates the media buyer, providing the media buyer with a token (e.g. JWT) for authentication while presenting ads to the user. The media buyer may access the service freely (e.g. every day for every campaign) to receive a valid token to be used during the current 'Per-Request Authentication' (e.g. for the current day).
FIG. 12 is a simplified flow diagram illustrating a per-request eligibility and authentication service, according to exemplary embodiments of the invention. The service both determines if the current device does or does not have the installation client installed and authenticates a current requested ad (e.g. the media buyer wants to display the ad to the user). The eligibility and authentication service service is accessed by the media buyer prior to displaying an ad on the device. The media buyer then receives a deep link with an authenticated token.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant devices, software applications, apps, App Stores, links, deep links and clients for devices will be developed and the scope of the terms device, software application, app, App Store, link, deep link and installation client are intended to include all such new technologies a priori.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A network-connected device configured for running software applications, comprising:
   a network interface configured for communicating over a network;
   at least one non-transitory computer readable storage medium storing instructions; and
   at least one processor associated with said network interface and said storage medium, configured to execute said instructions comprising steps of:
      receiving a user selection of a link within a second software application running on the network-connected device, the selection of the link indicating a request to install a first software application;
      responsive to receiving the user selection, determining whether an installation client is available on the network-connected device;
      responsive to the installation client being available:
         invoking the installation client to run on the network-connected device while the second software application continues to run in the foreground, the invoked client running in the background;
         determining, by the installation client in the background, whether the second software application is eligible to use capabilities of the installation client;
         responsive to a determination by the installation client that the second software application is eligible to use capabilities of the installation client, downloading an installation file for the first software application to the network-connected device, the downloading performed by the installation client in the background and without user interaction with an app store; and
         using the downloaded installation file, installing, by the installation client in the background, the first software application on the network-connected device while the second software application remains in the foreground.

2. The network-connected device of claim 1, wherein the storage medium further storing instructions which the at least one processor is configured to execute for:
   responsive to the installation client not being available, redirecting the device to an app store for obtaining the first software application, the redirecting occurring without an additional user interaction.

3. The network-connected device of claim 2, wherein said device is redirected to the app store using a preprogrammed app store redirect Uniform Resource Locator obtained via an ad server request.

4. The network-connected device of claim 1, wherein said installation file is downloaded by said installation client via direct communication between said device and a software repository storing said installation file, and without communication with an app store.

5. The network-connected device of claim 1, wherein said installation client obtains address information of said installation file, using information comprised in said link, by at least one of:
   constructing a network address of said installation file by address information retrieval from a non-transitory internal memory on said device; and
   querying an address repository over said network.

6. The network-connected device of claim 1, wherein said device is configured for providing an indication to a content provider whether said installation client is installed on said device and configured to be invoked when said link is selected, wherein said link is selectively formatted and provided by said content provider with content for presentation by said second software application in accordance with said indication.

7. The network-connected device of claim 6, wherein said indication comprising at least one member selected from the group consisting of: a uniquely identifying device identifier; a device type; a device maker; a device model; a device operating system; a carrier employed for network communication.

8. The network-connected device of claim 6, wherein said indication comprising a uniquely identifying device identifier, wherein said content provider accesses a database to determine, using said uniquely identifying device identifier, whether said installation client is installed on said device and configured to be invoked when said link is selected.

9. The network-connected device of claim 1, wherein said link is a deep link comprising an authentication token received from an authentication service configured to authenticate a media buyer for providing said link.

10. The network-connected device of claim 9, wherein said authentication token is associated with at least one of said device, an ad and an ad campaign specified.

11. The network-connected device of claim 1, wherein said second software application is designated at a server as a default handler of a deep link type comprising a deep link domain structure respective of said server, and wherein said at least one processor is further configured to validate a deep link selected on said device, said validating is performed using a certificate of said second software application obtained from said server in response to said deep link comprising said deep link domain structure.

12. The network-connected device of claim 1, wherein said link is selected by user interaction with said second software application using a user interface configured for presenting content provided by the second software application currently running in said foreground and for inputting user selections within said content.

13. The network-connected device of claim 12, wherein at least some of said user interface is integrated into said device.

14. The network-connected device of claim 1, wherein said link is embedded in content provided for presentation by said second software application.

15. The network-connected device of claim 1, wherein said installation client prompts for user confirmation of said installation of said first software application and performs said installation only when said confirmation is obtained, and wherein said installation client runs in said foreground during said prompting and obtaining confirmation and resumes operating in said background after receiving user input in response to said prompting.

16. The network-connected device of claim 1, wherein said installation client prompts for user confirmation of said installation of said first software application prior to said downloading and performs said downloading only when said confirmation is obtained, and wherein said installation client runs in said foreground during said prompting and obtaining confirmation and resumes operating in said background after receiving user input in response to said prompting.

17. The network-connected device of claim 1, wherein said at least one processor is further configured for executing said instructions to close said installation client when said installation of said first software application is completed.

18. The network-connected device of claim 1, wherein said installation client is invoked when said link comprises a deep link linking said installation of said first software application to said installation client.

19. A method for installation of software applications on a network-connected device, the method comprising:
    receiving, by a processor on the network-connected device, a user selection of a link within a second software application running on the device, the selection of the link indicating a request to install a first software application;
    responsive to receiving the user selection, determining whether an installation client is available on the network-connected device;
    responsive to the installation client being available:
        invoking the installation client to run on the network-connected device while the second software application continues to run in the foreground, the invoked client running in the background;
        determining, by the installation client in the background, whether the second software application is eligible to use capabilities of the installation client;
        responsive to a determination by the installation client that the second software application is eligible to use capabilities of the installation client, downloading an installation file for the first software application to the network-connected device, the downloading performed by the installation client in the background and without user interaction with an app store; and
        using the downloaded installation file, installing, by the installation client in the background, the first software application on the network-connected device while the second software application remains in the foreground.

20. The method of claim 19, wherein the installation client is invoked to run from a non-running state and further comprising:
    closing the installation client responsive to completion of the installation of the first software application on the device.

21. The method of claim 19, wherein downloading the installation file to the network-connected device further comprises:
    querying an address repository on an external server over a network;
    receiving from the address repository address information of the installation file in response to the query; and
    downloading the installation file to the network-connected device using the received address information.

22. The method of claim 19, wherein determining whether the second software application is eligible to use capabilities of the installation client further comprises determining that the second software application has been provided with a unique eligibility token by a server as a result of the second software application having registered with the server.

23. The method of claim 19, further comprising:
    responsive to the installation client not being available, redirecting the device to an app store for obtaining the first software application, the redirecting occurring without an additional user interaction.

24. The method of claim 23 wherein:
    the link selected by the user is an advertisement for the first software application, the link received by the network-connected device from an ad server; and
    redirecting the device to the app store further comprises forwarding to the ad server a notification of the user selection of the link.

25. A non-transitory computer readable medium including instructions that, when executed by at least one processor, cause said at least one processor to perform operations for installing software applications on a network-connected device, said operations comprising:
    receiving a user selection of a link within a second software application running on the network-connected device, the selection of the link indicating a request to install a first software application;
    responsive to receiving the user selection, determining whether an installation client is available on the network-connected device;
    responsive to the installation client being available:
        invoking the installation client to run on the network-connected device while the second software application continues to run in the foreground, the invoked client running in the background;

determining, by the installation client in the background, whether the second software application is eligible to use capabilities of the installation client;

responsive to a determination by the installation client that the second software application is eligible to use capabilities of the installation client, downloading an installation file for the first software application to the network-connected device, the downloading performed by the installation client in the background and without user interaction with an app store; and using the downloaded installation file, installing, by the installation client in the background, the first software application on the network-connected device while the second software application remains in the foreground.

26. The non-transitory computer readable medium of claim 25, wherein the second software application is eligible to use capabilities of the installation client by having been provided with a unique eligibility token by a server as a result of the second software application having registered with the server.

27. The non-transitory computer readable medium of claim 25, said operations further comprising:

responsive to the installation client not being available, redirecting the device to an app store for obtaining the first software application, the redirecting occurring without an additional user interaction.

* * * * *